(12) United States Patent
Lor et al.

(10) Patent No.: US 8,838,752 B2
(45) Date of Patent: *Sep. 16, 2014

(54) ENTERPRISE WIRELESS LOCAL AREA NETWORK SWITCHING SYSTEM

(75) Inventors: Kar-Wing Edward Lor, Castro Valley, CA (US); Richard Martin, Morgan Hill, CA (US); Alarabi Omar Hassen, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,900

(22) Filed: Jul. 7, 2010

(65) Prior Publication Data

US 2010/0275244 A1 Oct. 28, 2010

Related U.S. Application Data

(63) Continuation of application No. 12/153,679, filed on May 22, 2008, now Pat. No. 7,779,071, which is a continuation of application No. 10/632,807, filed on Aug. 4, 2003, now Pat. No. 7,440,573.

(60) Provisional application No. 60/416,528, filed on Oct. 8, 2002.

(51) Int. Cl.
*G06F 15/16* (2006.01)
*H04L 29/06* (2006.01)
*H04L 29/08* (2006.01)

(52) U.S. Cl.
CPC .... *H04L 29/08072* (2013.01); *H04L 29/06027* (2013.01)
USPC ........... 709/220; 709/224; 709/228; 455/41.2

(58) Field of Classification Search
CPC .............. H04L 29/06; H04L 29/08072; H04L 29/08144
USPC .......... 709/220, 224, 228; 455/100; 370/230, 370/231

See application file for complete search history.

(56) References Cited

U.S. PATENT DOCUMENTS 6,138,245 A * 10/2000 Son et al. ...................... 713/400
6,275,500 B1 * 8/2001 Callaway et al. ............. 370/449

(Continued)

FOREIGN PATENT DOCUMENTS

EP 1073294 1/2001

OTHER PUBLICATIONS

"Bluetooth and 802.11: A Tale of Two Technologies," 10Meters.com, <www.10meters.com/blue.sub.--802.html>, Dec. 2, 2000.

(Continued)

*Primary Examiner* — Khanh Dinh
(74) *Attorney, Agent, or Firm* — McDermott Will & Emery LLP

(57) ABSTRACT

A process of controlling a flow of data in a wireless network providing wireless access to the wireless network by wireless devices is disclosed. Data is received from a wireless device by a network device, through one access point of a plurality of access points in communication with the network device, indicating a client identifier for the wireless device. The client identifier is forwarded to an authentication server and the network device mediated authentication of the wireless device with the authentication server. Thereafter, data packets received from portions of the wireless network and from the plurality of access points are evaluated and the received data packets are passed to portions of the wireless network and to the plurality of access points, based on the evaluation of the received data packets. In addition, the network device periodically polls for a status of the wireless device from the access point.

19 Claims, 8 Drawing Sheets

(56) References Cited

U.S. PATENT DOCUMENTS

| | | | |
|---|---|---|---|
| 6,307,837 B1* | 10/2001 | Ichikawa et al. | 370/230 |
| 6,335,935 B2 | 1/2002 | Kadambi | |
| 6,496,935 B1 | 12/2002 | Fink et al. | |
| 6,779,030 B1* | 8/2004 | Dugan et al. | 709/223 |
| 6,898,652 B2* | 5/2005 | Peters et al. | 710/300 |
| 6,975,202 B1* | 12/2005 | Rodriguez et al. | 340/5.25 |
| 6,980,319 B2* | 12/2005 | Ohta | 358/1.18 |
| 7,173,918 B2 | 2/2007 | Awater et al. | |
| 7,209,964 B2* | 4/2007 | Dugan et al. | 709/223 |
| 7,287,072 B1 | 10/2007 | Dispensa et al. | |
| 7,440,573 B2* | 10/2008 | Lor et al. | 380/270 |
| 7,529,767 B2 | 5/2009 | DeAnna et al. | |
| 7,779,071 B2* | 8/2010 | Lor et al. | 709/203 |
| 8,078,730 B2* | 12/2011 | Travostino | 709/227 |
| 2001/0037395 A1 | 11/2001 | Sabat et al. | |
| 2002/0075844 A1* | 6/2002 | Hagen | 370/351 |
| 2002/0081971 A1* | 6/2002 | Travostino | 455/41 |
| 2003/0088633 A1 | 5/2003 | Chiu et al. | |
| 2004/0068668 A1 | 4/2004 | Lor et al. | |
| 2005/0021713 A1 | 1/2005 | Dugan et al. | |
| 2005/0254652 A1 | 11/2005 | Engler et al. | |
| 2008/0228942 A1* | 9/2008 | Lor et al. | 709/238 |

OTHER PUBLICATIONS

"Bridging a Wireless 802.11b Network with a Wired Ethernet Network" HomeNetHelp.com, Anomaly, Inc., <www.homenethelp.com/web/diagram/wireless-bridged.asp>, Aug. 20, 2002.

"Cable/DSL Router with Wired and Wireless Ethernet Built in," HomeNetHelp.com, Anomaly, Inc., <www.homenethelp.com/web/diagram/share-router-wireless.asp>, Aug. 20, 2002.

"Overview of UWB?", PulseLink.net, Pulse.about.Link, Inc., www.pulselink.net/ov.sub.--history.html, Sep. 4, 2002.

"Simple 802.11b Wireless Ethernet Network with an Access Point," HomeNetHelp.com, Anomaly, Inc., <www.homenethelp.com/web/diagram/access-point.asp>, Aug. 20, 2002.

"Simple 802.11b Wireless Ethernet Network without an Access Point," HomeNetHelp.com, Anomaly, Inc., <www.homenethelp.com/web/diagram/ad-hoc.asp>, Aug. 20, 2002.

"Ultra Wide Band," <www.ida.gov.sg/Website/IDAContent.nsf/dd1521fle79ecf3bc825682f0045a349/18-56626048baf403c82569880267e26%3FOpenDocument+%22Full+duplex+UWB+handheldtr-ansceiver%22&hl=en&ie=UTF-8>, Aug. 20, 2002.

"Wireless Access Point (802.11b) of the Router Variety," HomeNetHelp.com, Anomaly, Inc., <www.homenethelp.com/web/diagram/share-wireless-ap.asp>, Aug. 20, 2002.

"Wireless Ethernet Networking with 802.11b, An Overview," HomeNetHelp.com, Anomaly, Inc., <www.homenethelp.com/80211.b/index.asp>, Aug. 20, 2002.

802.11b Networking News, News for Aug. 19, 2002 through Aug. 11, 2002, <80211b.weblogger.com/>, Aug. 11-19, 2002.

Bahl, et al: "Pawns: Satisfying the Need for Ubiquitous Secure Connectivity and Location Services", IEEE Wireless Communications, , pp. 40-48, vol. 9.

Barrett, "History of UltraWideband (UWB) Radar & Communications: Pioneers and Innovators," Proceedings and Progress in Electromagnetics Symposium 2000 (PIERS2000), Cambridge, MA, Jul. 2000.

Bluetooth & 802.11b—Part 1, <www.wilcoxonwireless.com/whitepapers/bluetoothvs802.doc> Jan. 2002.

Brenner, "IEEE 802.11, A Technical Overview,",BreezeNet website, Jul. 8, 1997, <www.sss-mag.com/pdf/80211p.pdf>.

Brewin, "Intel, IBM Push for Public Wireless LAN," Computerworld.com, Computerworld Inc., Jul. 22, 2002.

Brewin, "Microsoft Plans Foray Into Home WLAN Device Market," Computerworld.com, Computerworld Inc., Jul. 22, 2002.

Brewin, "Report: IBM, Intel, Cell Companies Eye National Wi-Fi Net," Computerworld.com, Computerworld Inc., Jul. 16, 2002.

Brewin, "Vendors Field New Wireless LAN Security Products," Computerworld.com, Computerworld Inc., Jul. 22, 2002.

Conover, "Anatomy of IEEE 802.11b Wireless," NetworkComputing.com, Aug. 7, 2000.

Cringely, "The 100 Mile-Per-Gallon Carburetor—How Ultra Wide Band May (or May Not) Change the World," Interesting-People.org, Jan. 26, 2002.

Franklin, "How Bluetooth Works," Howstuffworks.com, Howstuffworks, Inc., <www.howstuffworks.com/bluetooth.htm/printable>, Aug. 15, 2002.

Fontana, "A Brief History of UWB Communications," Multispectral.com, Multispectral Solutions, Inc., <www.multispectral.com/history.html>, Aug. 20, 2002.

Freed, "Et Tu, Bluetooth?", ExtremeTech.com, Ziff Davis Media Inc., Jun. 25, 2001.

Harmuth, "An Early History of Nonsinusoidal Electromagnetic Technologies," Multispectral.com, Multispectral Solutions, Inc., <www.multispectral.com/history.html>, Aug. 20, 2002.

Jackson, "Ultrawideband May Thwart 802.11, Bluetooth Efforts," Telephony, PRIMEDIA Business Magazines & Media Inc., Feb. 11, 2002.

Khoo, "A CNET tutorial: What is GPRS?", CNETAsia, CNET Networks, Inc., Feb. 7, 2002.

Kissick, "The Temporal and Spectral Characteristics of Ultrawideband Signals," NTIA Report 01-383, Jan. 2001, <www.its.bldrdoc.gov/pub/ntia-rpt/01-383>.

Leeper, "Wireless Data Blaster," ScientificAmerican.com, Scientific American, Inc., May 4, 2002.

Lough, et al., "A Short Tutorial on Wireless LANs and IEEE 802.11," The IEEE Computer Society's Student Newsletter, Virginia Polytechnic Institute and State University, Summer 1997, vol. 5, No. 2.

Peretz, "802.11, Bluetooth Will Co-Exist: Study," 802.11-Planet.com, INT Media Group, Inc., Oct. 30, 2001.

Poe, "Super-Max-Extra-Ultra-Wideband!", Business2.com, Oct. 10, 2000.

Ross, "Early Motivations and History of Ultra Wideband Technology," Anro Engineering, Inc., Multispectral.com, Multispectral Solutions, Inc., <www.multispectral.com/history.html>, Aug. 20, 2002.

Salkintzis, et al: "WLAN-GPRS Integration for Next-Generation Mobile Data Networks", IEEE Wireless Communications, pp. 112-123, vol. 9.

Shaw, "Bluetooth and Wi-Fi: Friends or foes?" Network World Mobile Newsletter, Network World, Inc., Jun. 18, 2001.

Taylor, "Hello, 802.11b and Bluetooth: Let's Not Be Stupid!" ImpartTech.com, <www.ImportTech.com/802.11-bluetooth.htm>, Aug. 21, 2002.

Tyson, "How Wireless Networking Works," Howstuffworks.com, Howstuffworks, Inc., <www.howstuffworks.com/wireless-network.htm/printable>, Aug. 15, 2002.

Vaughan-Nichols, "Ultrawideband Wants to Rule Wireless Networking," TechUpdate.ZDNet.com, Oct. 30, 2001.

WaveLink Mobile Manager, Version 5.2 Users Guide, WaveLink Corporation, Revised Jun. 18, 2002, pp. 1-198.

WaveLink SNC 24, Version 4.0 for Spectrum 24 Networks, Point Information Network Corporation, pp. 1-172.

Zyren, et al., "Brief Tutorial on IEEE 802.11 Wireless LANs," AN9829, Intersil Corporation, Feb. 1999.

\* cited by examiner

ENTERPRISE WIRELESS LOCAL AREA NETWORK SWITCHING SYSTEM

REFERENCE TO RELATED APPLICATIONS

This is a continuation application of U.S. patent application Ser. No. 12/153,679, filed on May 22, 2008, issued as U.S. Pat. No. 7,779,071 on Aug. 17, 2010, which in turn is a continuation application of U.S. patent application Ser. No. 10/632,807, filed on Aug. 4, 2003, issued as U.S. Pat. No. 7,440,573 on Oct. 21, 2008, which in turn claims priority of U.S. Provisional Patent Application No. 60/416,528, filed on Oct. 8, 2002. The subject matter of the earlier filed applications are hereby incorporated by reference.

BACKGROUND OF THE INVENTION FIELD OF INVENTION

The present invention relates to devices, software applications and networks that utilize data that is sent or received over data communication or computer networks. The present invention further relates to devices, software applications and networks that control the type and amount of data sent and received on enterprise wireless local area networks. More specifically, the present invention is directed to wireless local area networks in enterprise environments that provide ease of installation and seamless transitions between portions of the wireless local area network.

DESCRIPTION OF RELATED ART

Wireless Local Area Networks (WLANs) are gaining popularity as the method of networking users in the enterprise. The advantages WLANs provide over conventional wired LANs are user mobility, ease of installation, seamless transition between enterprise and telecom provider environments and connectivity in public places (such as airports, libraries and conferences), and other advantages.

There are many areas where existing WLAN solutions have room for improvement, and the next generation WLAN networks in the enterprise environment will need to provide additional features and functionalities. The issues involved with the enterprise wireless LAN architecture include security, access control, mobility, network management, load balancing, and quality of service. These areas are closely related, yet each of them posts unique requirements that the enterprise WLAN architecture addresses.

Existing WLAN solutions are intended for use in limited installations such as a home or small office, but they are still lacking in many areas when deployment in large enterprises is required. As such, there is a need for a method or mechanism in the prior art that can provide an enterprise WLAN architecture that provides for ease of installation and maintenance, seamless mobility of wireless devices in the enterprise and security for the enterprise.

SUMMARY OF THE INVENTION

This invention seeks to overcome the drawbacks of the above-described conventional network devices and methods. The present invention is directed to components of an enterprise WLAN architecture that provides for ease of installation and maintenance, seamless mobility of wireless devices in the enterprise and security for the enterprise. The present invention is also directed to enterprise WLAN switches that enable many of the functionalities of the enterprise WLAN architecture.

According to one aspect of this invention, a process of controlling a flow of data in a wireless network providing wireless access to the wireless network by wireless devices is disclosed. Data is received from a wireless device by a network device, through one access point of a plurality of access points in communication with the network device, indicating a client identifier for the wireless device. The client identifier is forwarded to an authentication server and the network device mediated authentication of the wireless device with the authentication server. Thereafter, data packets received from portions of the wireless network and from the plurality of access points are evaluated and the received data packets are passed to portions of the wireless network and to the plurality of access points, based on the evaluation of the received data packets. In addition, the network device periodically polls for a status of the wireless device from the access point.

Alternatively, the evaluation of the data packets may include filtering of the received data packets, such that filtered data packets can be dropped to limit an effectiveness of a denial of service attack. Additionally, the step of mediating authentication of the wireless device may include restricting access to the wireless network by the wireless device based on a category of user determined from the client identifier, based on a type of device to which the wireless device belongs or based on an hour and a day of the week in which the data was received from the wireless device. The access restriction may be based on a physical location of the one access point of a plurality of access points or based on a type of an application, running on the wireless device, seeking network access for the wireless device. In addition, the process can include forwarding updates to software and configurations of the plurality of access points to the plurality of access points from a single site on the wireless network.

Also, where coverage areas for at least two of the plurality of access points overlap, the process can also include monitoring usage by wireless devices of the at least two of the plurality of access points and prompting the at least two of the plurality of access points to change the usage by the wireless devices such that a load carried by the at least two of the plurality of access points is balanced. The load carried by the at least two of the plurality of access points may be determined by at least one of a number of wireless devices using the at least two of the plurality of access points, a number of packets transmitted and received by the at least two of the plurality of access points, an average bandwidth carried by the at least two of the plurality of access points priorities of packets recently transmitted and received by the at least two of the plurality of access points, a type of application running on the wireless devices and communicating with the at least two of the plurality of access points and a signal strength provided to the wireless devices provided by the at least two of the plurality of access points.

According to another embodiment of this invention, a priority indicated by the data packets may be maintained and the data packets may be tagged with a priority tag to be evaluated by the access points. Alternatively, a prioritization policy may be established based on filtering of the data packets and the data packets may be tagged with a priority tag to be evaluated by the access points based on the established prioritization policy. Also, a bandwidth usage policy may be established for the wireless devices and the plurality of access points may be instructed to follow the established bandwidth usage policy.

In another embodiment, the process may include receiving a re-association request from a transferring wireless device through a new access point of the plurality of access points, where the transferring wireless device was previously associated with an old new access point of the plurality of access points, providing session information for the transferring wireless device to the new access point and updating a routing table with a routing location of the transferring wireless device. Additionally, the received data packets may be encapsulated with Internet protocol information associated with the new access point. Also, the process may include receiving a re-association request from a transferring wireless device through a new access point of the plurality of access points, where the transferring wireless device was previously associated with an alternate access point in communication with the wireless network through an alternate network device, sending a request for configuration information for the transferring wireless device from the alternate network device and forwarding access point configuration data, determined from the configuration information for the transferring wireless device received from the alternate network device, to the new access point.

Additionally, the wireless device may be a wireless internet protocol phone, the client identifier may be call setup data and voice over internet protocol data packets may be passed to portions of the wireless network and to the plurality of access points, based on the evaluation of the received voice over internet protocol data packets. In addition, the process may include sending a call connected signal received from an internet protocol phone gateway to the one access point and mediating a negotiation of network resources between the internet protocol phone gateway and the wireless internet protocol phone.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 1:
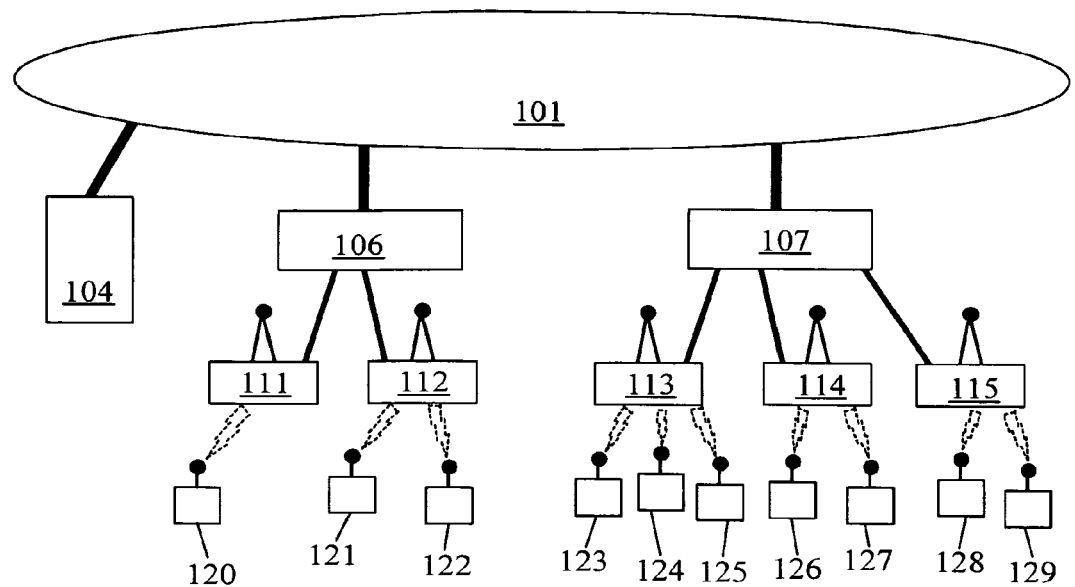
FIG. 1 is a schematic representation of the components of an enterprise wireless local area network, according to one embodiment of the present invention.

In an enterprise Wireless LAN environment, the wireless devices typically are located at the edge of the network. The wireless devices, 120-129, as shown in FIG. 1, are connected to the enterprise network via the Access Points, 111-115, which in turn are the edge devices of the wired LAN. The Access Points, 111-115, are connected to the LAN via switches, 106 and 107. These switches, called Wireless LAN Switches, do not only perform Layer 2 switching, but also act as a wireless edge manager. They provide the additional functionalities like access control, firewall functions, traffic privacy and quality of service, network management, and load balancing. A high-level architecture of an Enterprise Wireless LAN, with the switches also serving as the edge managers, is illustrated in FIG. 1. Also illustrated is the larger LAN, 101, through which the wireless LAN switches, 106 and 107, are connected, as well as to an authentication server 104.

In this architecture, the wireless transmission between the client and Access Point is secured, while the wired connection between the Access Point and the enterprise switch is also secured. The switch and the AP communicate in regular Ethernet traffic. From the switch's perspective, it is simply switching regular Layer 2 frame. In the switch, the knowledge of a WLAN and its management intelligence primarily reside in a controller for the switch mediated by software.

In terms of wired LAN security, the AP can be used as the wired/wireless demarcation point. The security issues inside the wired portion of the LAN are not specifically addressed herein as they are generally known. The WLAN is expected to conform to an overall Enterprise LAN security policy, if there is one, as is the wired portion of the LAN. However, security requirements pertinent only to the wired LAN are not addressed here.

In the Wireless LAN environment, the corporate user can establish an extra virtual private network (VPN) tunnel between the wireless client and the corporate network. This VPN tunnel will terminate at a VPN server inside the LAN. For legacy wireless clients and AP, VPN is virtually a mandatory method to ensure wireless security. However, as the wireless security standards evolve, the Information Technology (IT) manager may choose different mechanisms to provide security. Since VPN tunnels is not a mandatory measure for the new generation of WLAN access, and there are many well known drawbacks on enforcing a VPN-based access, the present application does not directly address mandatory VPN tunnels.

Generally, the issues involved with the enterprise wireless LAN architecture of the present invention can be divided into six major areas. These areas include security, access control, mobility, network management, load balancing, and quality of service. These areas are closely related, yet each of them posts unique requirements that the enterprise WLAN architecture addresses. The following sub-sections address these areas in terms of functionality, interface with external entities, and performance requirements.

Security

A wireless LAN should be no less secure than a conventional wired LAN. Because of the public nature of the medium, introducing wireless LAN segments into an otherwise secure infrastructure also introduces a number of potential security problems, including: anonymous passive eavesdropping, unauthorized connection to the network, session hijacking and denial of service by jamming.

Many such attacks are facilitated by open source hacker tools, easily available over the Internet. The wide availability of low cost wireless LAN technology introduces another threat, unauthorized connection of a rogue wireless base station, often for casual personal use. WLAN security vulnerabilities and countermeasures are discussed, and an implementation approach for security mechanisms, according to the present invention, is also discussed.

Wireless LANs are subject to two major categories of attacks: so called conventional LAN attacks and attacks specific to wireless LANs. One of the threats that affect both conventional switched wired LANs and WLANs is Man-in-the-Middle Attacks, including router redirection and ARP spoofing. These enable both passive and active attacks including packet modification.

Also included in the "conventional" types of attacks are TCP/IP denial of device attacks, including a class of attacks such as TCP SYN flooding using randomly changing source IP addresses, impersonation, using IP or MAC address spoofing, password guessing attacks, network probing and topology discovery attacks, such as port scans and Simple Network Management Protocol (SNMP) attacks.

Alternatively, many threats take advantage of the lack of physical wiring in WLANs. These include the use of a wireless sniffer, where the attacker captures over the air traffic and obtains sensitive information, such as a user's password. The attacker can then masquerade as a legitimate user and gain access to the network. Hacker tools such as "dsniff" or "airsnort" can enable this threat. Additionally, these techniques include war driving, which is analogous to "war dialing", where the attacker drives around a building using an enhanced antenna to locate "hot spots" and unprotected wireless networks to attack. Also included is the use of rogue access points, where users setup rogue wireless LANs for their own convenience, but open up holes in the corporate network infrastructure.

Additional threats that take advantage of the lack of physical wiring in WLANs include access point cloning, which is a variant on the classic login spoof, where the attacker introduces his own AP (with a stronger signal) and steals user passwords. Also as a threat can be client-to-client attacks, where wireless clients often have "ad hoc" mode configured by default, which can leave them subject to attacks such as unauthorized file sharing. Additionally, there are implementation weaknesses, such as, for example, exploitation of known key management weaknesses of Wired Equivalent Privacy (WEP), often aided by hacker tools such as "airsnort". Also, through misconfiguration, access points that do not have the security features turned on can be used to gain improper access.

The present invention utilizes several methods for threat mitigation, the first of which includes secure communication protocols. Included below is a list of security protocols that may be used in order to mitigate the above security threats. These protocols include IEEE 802.1x that provides Port-based user authentication. The proposed IEEE 802.11i standard specifies extensions to the 802.1x EAPOL (Extensible Authentication Protocol (EAP) over LAN) protocol to establish shared cryptographic contexts between the Client (supplicant) and the AP (authenticator). Also, EAP is an Internet Engineering Task Force (IETF) standard that defines a general purpose authentication exchange. EAP supports multiple authentication mechanisms, e.g., Challenge Handshake Authentication Protocol (CHAP), Extensible Authentication Protocol-Transport Layer Security (EAP-TLS), and Protected EAP (PEAP).

Another protocol is TKIP (Temporal Key Integrity Protocol), which is defined in the proposed 802.11i standard. TKIP is intended for interim deployment and retrofit of existing WEP devices. TKIP uses the 802.1x shared cryptographic context and derives per-packet keys. It uses a new algorithm, called Michael, for packet level integrity. TKIP was motivated by a need to overcome the notorious key derivation and packet integrity weaknesses of WEP. It retains WEP frame formats and use of the RC4 algorithm. Another protocol is WRAP is the proposed in IEEE 802.11i as a long-term security solution. Like TKIP, it uses IEEE 802.1x shared cryptographic contexts and provides per-packet key management and integrity. WRAP uses the Advanced Encryption Standard (AES) algorithm for both data confidentiality and integrity. Counter with Cipher Block Chaining-Message Authentication Code (CCM) and Offset Codebook (OCB) are modes of operation that combine encryption and integrity in a single pass.

Other protocols include proprietary WEP extensions that provide user authentication coupled with per-station encryption "dynamic" WEP keys, and are built on EAP and IEEE 802.1x. These predate and will be mostly replaced by TKIP, but will continue to exist in specific vendor offerings. For example, LEAP is supported by CISCO and Microsoft and EAP-TLS is backed by Microsoft. Additionally, there are a number of EAP mechanisms, including, EAP-TLS, which embeds the TLS (Transport Layer Security) protocol establishment handshake in EAP to encrypt key management messages, EAP-TTLS, which is a derivative of EAP-TLS and PEAP (Protected EAP), which also uses TLS handshake messages.

Also included with the protocols are VPN Protocols, where IPsec is the IETF IP security protocol widely used for VPNs. This approach treats the WLAN as totally untrusted, a so-called Wireless Demilitarized Zone (DMZ), and requires users to tunnel into the enterprise network using a VPN protocol, as they would from the Internet. IPsec provides layer 3 security. Also, Point-to-Point Tunneling Protocol (PPTP) is a proprietary security protocol that has been replaced by IPsec but is still widely used for VPNs since it is in every Windows client. PPTP provides layer 2 encapsulation over IP.

Another method for threat mitigation involves packet filtering. This uses general purpose IP layer ingress filtering for limiting or preventing denial of service attacks, such as TCP SYN. The process of filtering in network devices is discussed in U.S. Pat. No. 6,335,935 and is hereby incorporated by reference.

Access Controls

Access control mechanisms provide the ability to enforce security policies on network use. Access controls are most effective at the user level, and can be applied with various degrees of granularity. Access control mechanisms become more important in the context of wireless LANs, as the public nature of the medium again makes it possible to provide services such as "guest" access.

The most efficient way to implement access control is at the edge of the wireless medium, i.e. the Access Point or AP.

However, the APs may or may not be equipped with acceptable access control enforcement capabilities. In case they are not, the WLAN Switch serves as the second line of defense, or the access control enforcer.

There are several types of access control policy that a WLAN should support, including client identity based, time-based, location-based, and application-based. The more common case would involve a combination of these. They are described in the following paragraphs.

Client based access controls grant access rights to a specific user or a category of users based on authenticated identity. Examples of user categories include regular employees, contractors, corporate partners, visitors, or specific enumerated groups. Each type of user may be granted different access rights, for example, to the entire corporate network or only a particular subnet, the Internet, to particular applications, and/or to particular network services.

Client based access policies may or may not be independent of the device used. For example, a user with two different laptops who would access the WLAN using two different MAC addresses could have the same access rights. On the other hand, the access rights for the same user from a laptop or from an IP phone are likely to be different. A laptop should be given access to the entire network. Since an IP phone is only a device that supports one particular application, it should be granted access only to that application, and may be restricted on the basis of Virtual Local Area Network (VLAN), IP subnet, protocol, port, etc., as configured for the Voice-over-IP (VOIP) application.

WLAN access policy may be based on the time-of-the-day or day-of-the-week. For example, WLAN access may be disabled for visitors during non-working-hours and weekends, since it is not likely to have visitors on the premises during these hours to use the WLAN. Employees and contractors may be prohibited from accessing certain streaming video servers or databases during work hours, etc.

Time-based access policies can also specify a time limit a client can access the WLAN. It can be implemented as a session time-out. Typical usage of this mechanism might include requiring that a certain type of user can only access the network for a specific time-span or requiring that a session be terminated due to idling.

WLAN access policy may be based on physical location, that is, based on the location of the AP. Certain locations in the premise may be less secured than others, thus it may be desirable to restrict wireless access from these locations. For example, a training room or front lobby is often frequented by visitors, and access to the public Internet from such locations might be desirable, preventing access to the internal corporate network. Employees trying to access the corporate network from such a location might be required to go through the Internet using a VPN.

Access control policies may be based on application because some applications need more resources than other. For example, peer-to-peer-type file downloading and streaming video especially may not be welcome during work hours. Access can be controlled at either the AP or the WLAN switch by inspecting the packet content. Packets from unwelcome traffic are thus discarded. In the case of all of these access control procedures, the access control is configured into the AP or WLAN Switch, via configuration scripts, command line interface or web-based console.

With respect to secure WLAN entities, the wireless Client (end station, STA) is the user authentication agent acting as an IEEE 802.1x supplicant relative to IEEE 802.11i. It must support the authentication mechanisms to enable it to use EAP to authenticate the user to an Authentication Server (AS). The Client must support its end of whatever data security protocol it needs to support (e.g., TKIP, LEAP, VPN).

With respect to secure WLAN entities, the wireless Client (end station, STA) is the user authentication agent acting as an IEEE 802.1x supplicant relative to IEEE 802.11i. It must support the authentication mechanisms to enable it to use EAP to authenticate the user to an Authentication Server (AS). The Client must support its end of whatever data security protocol it needs to support (e.g., TKIP, LEAP, VPN).

Another secure WLAN entity is the Authentication Server, AS, maintains the user authentication database. It has the EAP mechanisms needed for its end of the user authentication exchange. For 802.11i, it has the ability to provide keys for shared cryptographic contexts between Clients and APs. The AS is usually a Remote Authentication Dial-In User Service (RADIUS) server, but the AS functionality could be provided collocated with some other network entity, such as the AP or the switch.

The Authorization Server maintains the user access control database, consisting of access control rules organized into access control lists (ACLs). A proprietary protocol may be required to exchange ACLs if the Authorization Server is not collocated with the enforcement function. The WLAN Switch provides fine-grained, layer 2/3/4 access control enforcement. It may require VPN capability for secure connection to APs if the LAN is not physically secure. VPN tunneling, if used to provide Client over the air security, requires an upstream VPN server. Note that keying would be part of the VPN protocol (e.g., IKE for IPsec), independent of the AS.

The functions related to WLAN security and their allocation are as follows:

TABLE 1

| | | |
|---|---|---|
| Authentication | Client, AP, AS | The Client communicates with the AS to authenticate. The AS communicates with the AP to allow authenticated access, and to provide shared cryptographic contexts. |
| Access Control | Switch, Authorization Server | The WLAN Switch filters traffic by policy parameters such as: Switch Port, application, time of day, user level, based on ACLs received from the Authorization Server. |
| Key Management | Client, AP, AS | Shared cryptographic contexts result as a by-product of the authentication exchange. |
| Encryption/ Decryption | Client, AP | As part of over the air security, the AP needs to support multiple encryption protocols, including WEP, TKIP, and the AES modes. |
| Traffic Segregation | Switch | Confines the AP's constituting the WLAN to a "wireless DMZ", user traffic to separate VLANs. Can provide MAC based VLANs for segregating user traffic. |
| VPN tunnel termination | VPN Gateway | This is needed if over the air security is provided using IPsec or PPTP. |

Based on the above division of labor, the suggested demarcation of security measures in a Wireless LAN is derived. The demarcation lines indicate where the security features are actually implemented, instead of where the security decisions are made. For example, the authentication database is kept in an Authentication Server, but the encryption/decryption is actually carried out in the Access Point. The demarcation recommendation is based on the commonly known capabilities of the devices in the network. However, that does not preclude embodiments that can carry out all the security features in a single unit.

Figure 2:
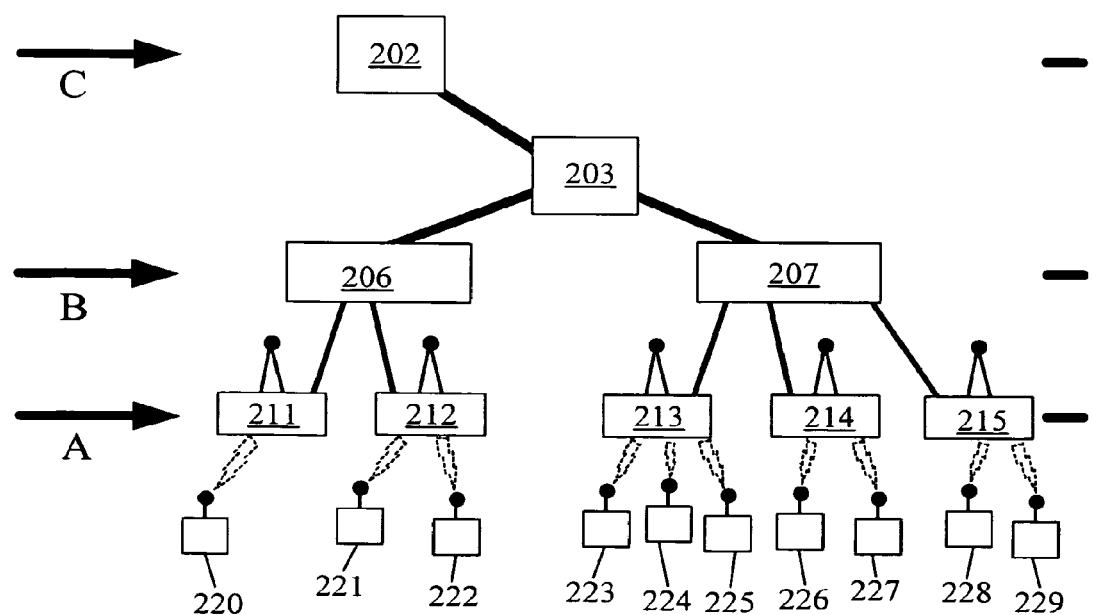
FIG. 2 illustrates a schematic representation of the lines of security enforcement demarcation in an enterprise wireless local area network, according to one embodiment of the present invention

The security enforcement demarcations are illustrated in FIG. 2, according to one embodiment of the present invention. In FIG. 2, the wireless devices, 220-229, are connected to access points, 211-215. At the level of arrow A, user authentication and encryption and decryption occur. The Access Points, 211-215, are connected to wireless LAN switches, 206 and 207. At the level of arrow B, access control and user segregation occurs. The switches, 206 and 207, are connected to a router, 203, where the latter is connected to a VPN gateway, 202. It is at the level of arrow C that the VPN tunneling occurs.

To provide a viable solution for enterprise wireless LANs, the enterprise switch has the following security features: support for 802.1x authentication, advanced filtering to implement access control policies, including stateful inspection, MAC-Based VLANs, supporting user segregation, and support for a messaging protocol that allows for mutual recognition between switch and AP and the transfer of user-context between switches or switch ports so user is not required to authenticate again. The latter aspect is dealt with more fully in the next section.

Mobility

There are two specific mobility management embodiments discussed herein in the Wireless LAN architecture of the present invention. These embodiments include mobility handoff within the same WLAN switch and handoff across WLAN switches. These embodiments are analogous to the Inter-Base-Station handoff and Inter-Mobile-Switching-Center handoff in a cellular network. Handoff within the same WLAN switch requires updating of client information only within the switch, from one switch port to another. Handoff across switches requires an infrastructure for switches to share client session information. The client session information is either centralized or distributed.

Figure 3:
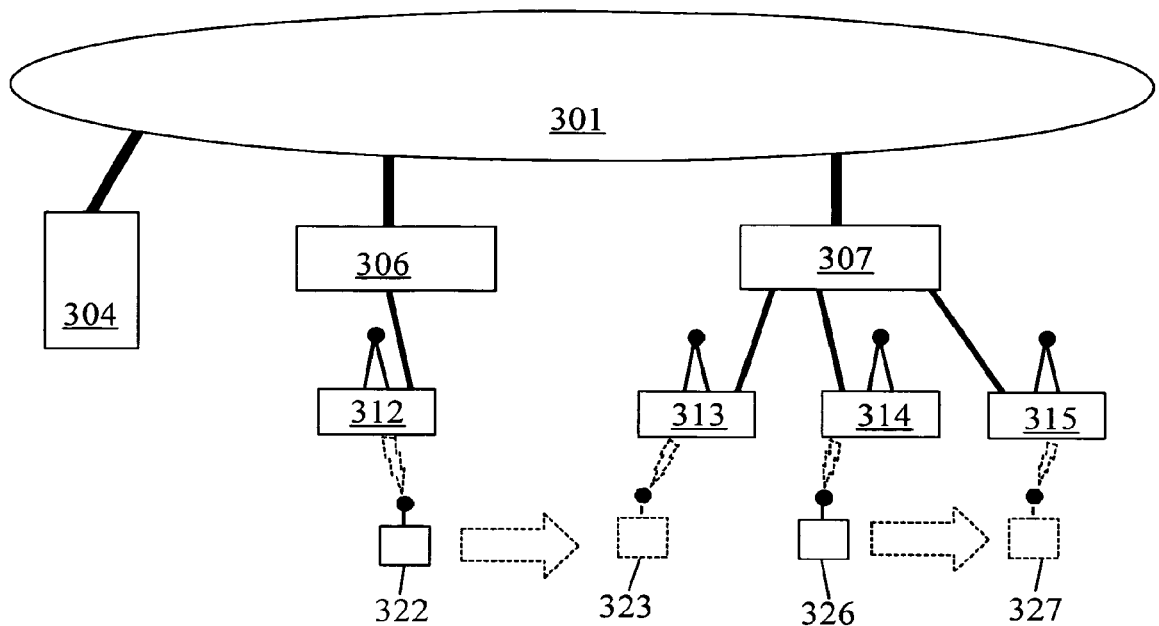
FIG. 3 is a schematic illustrating the types of mobility handoff in wireless local area network, according to one embodiment of the present invention.

The two handoff scenarios are illustrated in FIG. 3. The LAN, 301, connects the wireless switches, 306 and 307, and also connects to the authentication server, 304. The AP, 312, is connected to switch 306 and APs, 313-315, are connected to switch 307. The handoff between switches is illustrated as wireless device 322 passes over to the position of wireless device 323. The handoff within the same WLAN switch is illustrated as wireless device 326 passes over to the position of wireless device 327

There are two types of persistency requirements for WLAN handoff: session persistency and application persistency. In session persistency, a handoff should not disrupt a session. In other words, the wireless client should not require re-authentication when he travels from one Access Point to another. When the session is transferred from one AP to another, all attributes associated with that session, like client-based bandwidth limitation, access rights, etc. should also be transferred. In application persistency, a Handoff should not disrupt an application. In other words, a wireless client application should not be aborted and restarted when the wireless client travel from one AP to another. In addition, attributes associated with that application session should also be transferred to the new AP. The attributes include application-based QoS, bandwidth allocation, access control, etc.

The significant issues in WLAN handoffs include re-association with the network, as well as re-directing traffic to the client in a new physical location. These two issues are addressed in the subsequent sections.

When a wireless client moves from one zone to another, the client will re-associate with another AP. This re-association leads to the old AP and the new AP exchanging the client session information. Following the framework of 802.11f, or Inter Access-Point Protocol (IAPP), the session information, or connection context, exchanged between the APs may include session information like encryption/decryption key, Service Set, etc. With this exchange, the client at the new location can resume communication immediately, thus eliminating the need of re-authentication.

Figure 4:
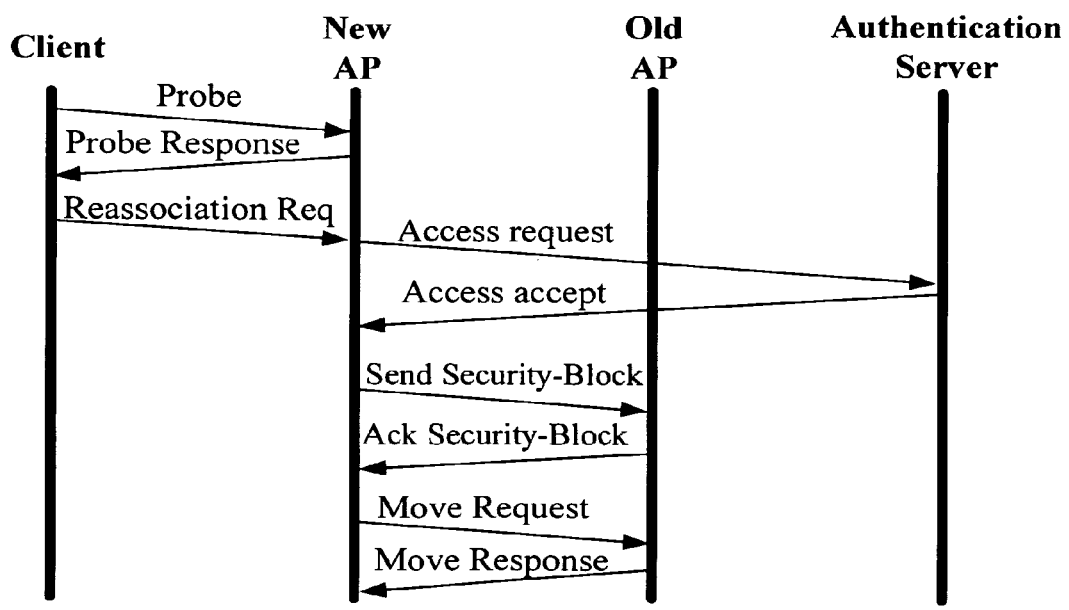
FIG. 4 illustrates the message exchange sequence for re-association, according to one embodiment of the present invention.

The information exchange among the related entities, including the client, the old and new AP, and the authentication server, in a re-association process is illustrated in the message sequence chart in FIG. 4. The messages exchanged are either IEEE 802.11 or 802.11f messages.

In this message exchange, the client sends a re-association request, which includes the Basic Service Set ID (BSSID) of the old AP, to the new AP. At this point, the new AP does not have any information on where this client is coming from, but it will send the BSSID in an Access-Request message to the authentication server, which will return information regarding the old AP, including its IP address.

A transfer control protocol (TCP) connection is then established between the new and old AP. If security is desired in this connection, the two APs will exchange optional encryption information in a Send-Security-Block and Ack-Security-Block message pair. In these two messages, the two APs agree on encryption key in messages between them. After that, the new AP will send a Move-Request message to the old AP, which will respond with a Move-Response message that contains the connection context.

In the Enterprise WLAN architecture of the present invention, the re-association will also cause switch related session information to be exchanged between switches if the handoff involves more than one. Such information may include authorization, access rights, quality of service parameters, bandwidth management parameters, etc.

This handoff mechanism in the Enterprise WLAN of the present invention is discussed below. There are at least two approaches to re-direct traffic after handoffs. The following subsections address the two approaches according to two embodiments of the present invention. In both approaches, it is assumed that VPN tunneling is not used for the client for ensure a secured wireless connection. This objective is met by the newer encryption method, Advanced Encryption Standard (AES), used in the wireless transmission.

In the Single Subnet Approach, the entire enterprise is confined to a single IP subnet. All the mobile clients are assigned to IP addresses in this subnet. When a client moves from one AP zone to another AP zone, the IP address of the client remains the same. It is up to the switching or routing device to update its internal table such that all subsequent packets to the client will be switched or routed correctly. The two scenarios of same-switch handoff and across-switch handoff are addressed below.

In Same-Switch Handoff, the old and new APs are connected to the same switch. The old AP must inform the switch that the client is no longer associated with it, while the new AP must inform the switch that the client is newly associated with it. The switch has to update its L2 switching table such that subsequent packets for the client will be switched out correctly. This is done by purging the existing entry of the mobile client in the L2 table. The next packet destined to the mobile client will thus induce an unknown unicast, as if the packet has been handled by the switch at the downstream direction at the very first time.

Figure 5:
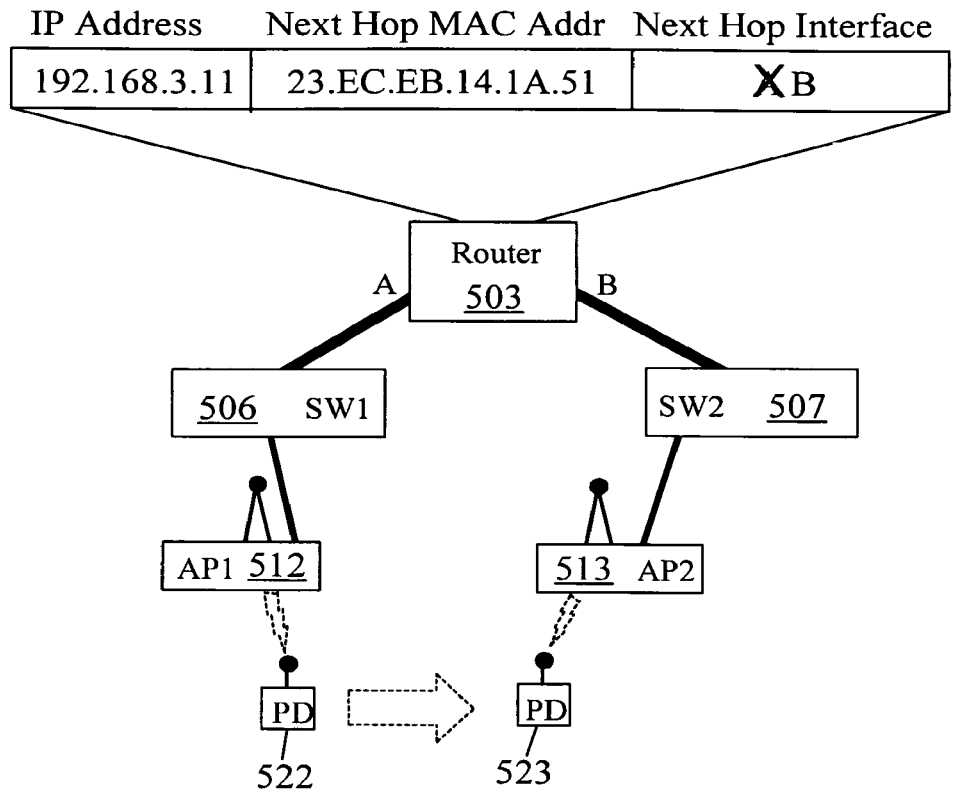
FIG. 5 illustrates a handoff in a single IP subnet, according to an alternate embodiment of the present invention.

In Across-Switch handoff, there is an entry in the routing table in the router that maps the IP address of the mobile station to the interface to the old switch, or SW1, 506, in FIG. 5. Switch SW1, 506, is connected at A of the router 503 and switch SW2, 507, is connected at B of the router 503. The mobile client 522 moving to AP2 513 should allow that routing table entry to expire, as any packet destined to mobile client routed to interface A would not reach its destination. Normally for unicast, the routing table entry of {192.168.3.11, 23.EC.EB.14.1A.51, A} would be updated by {192.168.3.11, 23.EC.EB.14.1A.51, B} when one of the four situations arises.

The routing table may be updated when the mobile client 192.168.3.11 sends a packet to the network via the router or when the mobile client's ARP entry expires and broadcasts a new Address Resolution Protocol (ARP) requests. Also, the routing table may be updated if there is an existing TCP connection between the mobile client and another entity in the network, such that any subsequent downstream TCP traffic will not be routed properly. The broken TCP connection will induce the router to send an ARP request to the subnet, and thus updating the routing table with the mobile client's new next-hop. Also, the routing table may be updated when SW1 506 and SW2 507, both aware of the handoff, send proprietary messages to the router 503 to notify the router to update the entry. If a proprietary message is not desired, a packet from SW2 faking the mobile client's MAC/IP addresses may be sufficient to cause an update on the router. If there are multiple routers between SW1 and SW2, all affected interim routers also have to be updated. Once the routing table is updated, all subsequent packets destined to 192.168.3.11 will be correctly routed to SW2, AP2 and then the mobile client.

The Single Subnet method is a simple method to implement to support wireless client mobility. The shortcomings, though, is that this method is not scalable. It has only a limited number of subnet addresses (for a subnet of 192.168.3.x, the number of wireless clients supported is 254). It cannot support an enterprise that requires a larger number of wireless connections.

A more flexible, scalable approach to WLAN mobility is Mobile IP. An Internet Engineering Task Force (IETF) standard, Mobile IP is a mechanism that allows a permanent IP address of a mobile client to be used in different IP subnets, when the client moves around in the mobile network covered by different APs.

Figure 6:
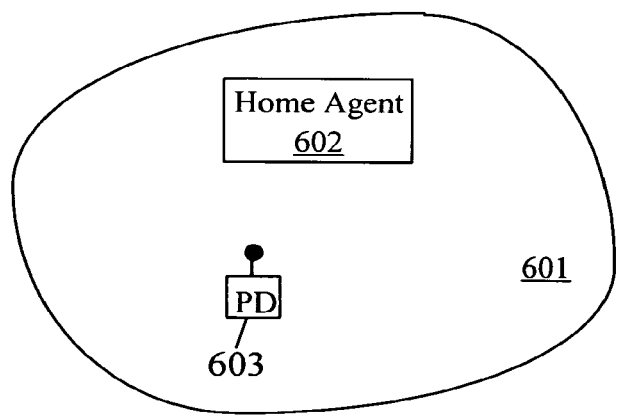
FIG. 6 illustrates a home agent and a home subnet, according to an alternate embodiment of the present invention.

Mobile IP uses the concept of a home network and a foreign network for the client. The home network is where the mobile client obtains its IP address. In the home subnet, 601, as illustrated in FIG. 6, there is a node called the home agent, 602, which serves as the care-of address for the mobile client. The home agent receives all the traffic for the client, 603. As long as the client stays in the home network, the home agent simply forwards the traffic to the client. Usually, a router in the home subnet plays the role of the home agent.

Figure 7:
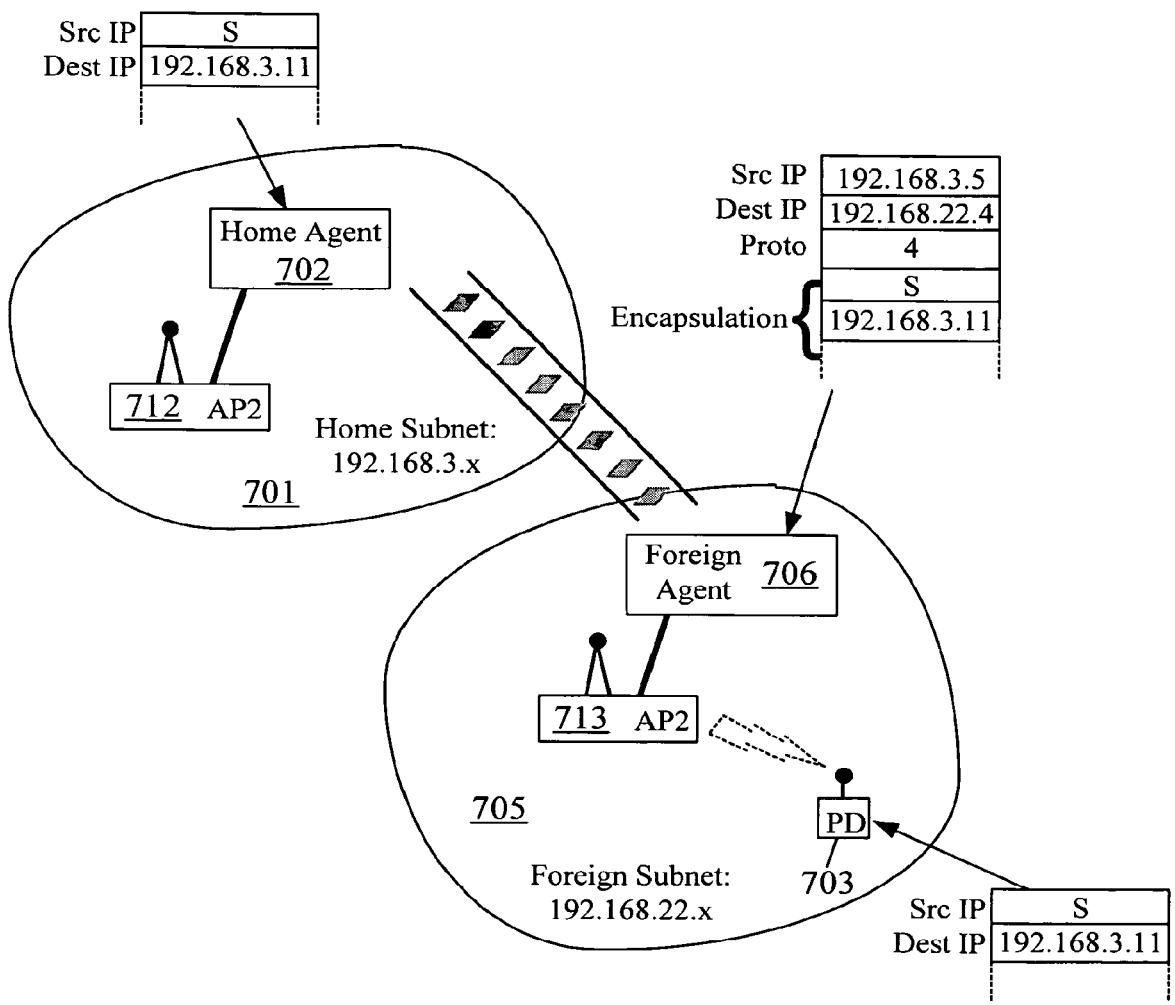
FIG. 7 illustrates an example of tunneling in mobile IP between home and foreign subnets, according to an alternate embodiment of the present invention.

When the mobile client 703 moves from one subnet to another, i.e. 701 to 703, as illustrated in FIG. 7, the IP address of the client stays the same. As it is physically in another subnet, traffic destined to the client cannot be normally routed through the Enterprise LAN to the client. A tunneling mechanism is needed to re-direct the traffic from the old or home subnet to the new or foreign subnet. Like the home agent, 702, the foreign subnet, 705, also has an entity called the foreign agent, 706, to take care of the redirected traffic for the mobile client. Each agent has an associated AP, 712 and 713. The tunnel established between the home agent and the foreign agent is illustrated in FIG. 7.

The tunneled traffic is encapsulated in another standard protocol, either IP-in-IP or minimal encapsulation. The home agent is responsible for encapsulating the traffic destined to the mobile client, and forwarding it to the foreign agent. The foreign agent is responsible for removing the encapsulation form the tunneled traffic, and forwarding it to the mobile client.

In the illustration of FIG. 7, the mobile client has an IP address of 192.168.3.11, obtained from the 192.168.3.x subnet. As the client moves into the 192.168.22.x subnet, the home agent, which intercepts all the traffic for the client, will forward it to the foreign agent currently associated with the client, which is the foreign agent in the 192.168.22.x subnet. Using IP-in-IP, a tunneled packet will have the home agent's IP address (192.168.3.5) as the source address, the foreign agent's IP address (192.168.22.4) as the destination address, and protocol type of 4 (IP-in-IP). The original packet will become the payload of this IP-in-IP packet.

The critical aspects of Mobile IP are agent discovery and agent registration. When the mobile client enters a new mobile zone, it has to discover the agent of this subnet serving as mobile clients' foreign agent. It also has to register with its own home agent of the current foreign agent, such that the home agent knows where to direct the traffic.

In the Mobile IP approach, the router and the client are the only relevant players in the infrastructure. The router must be enabled with Mobile IP, while the protocol stack in the client must also be able to support Mobile IP. It is acknowledged that Mobile IP is not widely deployed in Enterprise Network and that routers and clients would need to be updated to support Mobile.

As Mobile IP is not necessarily deployed on legacy routers, an alternative approach is for the WLAN Switch to perform the tunneling for the roaming client. As in Mobile IP, there can be multiple IP subnets, each of which covers one or more AP zones.

The alternative tunneling method stems from the concept of Mobile IP. The only difference is that the agents are not the routers anymore but the Enterprise WLAN switches. As a result, the tunnels are established between the WLAN switches instead of the routers.

When the mobile client moves to another AP zone that is configured in a different IP subnet, the home agent, the WLAN switch in the home subnet, still receives the packets for the mobile station. As the mobile client is not wireless-linked to the home agent, a foreign agent in the new subnet is required to deliver the packets.

The foreign agent is another WLAN switch in the new IP subnet the mobile client moves into. As the mobile client does not change its IP address, the packets will not be forwarded to the new subnet. As in Mobile IP, a tunnel is established between the two WLAN switches. Using this tunnel, the home agent forwards all the packets to the foreign agent, which in turn delivers the packets to the mobile client. The original packet destined to the mobile client is simply encapsulated within the tunneled IP packet, using standard tunneling protocol like IP-within-IP or minimal encapsulation. Upon receiving the packet, the foreign agent simply switches the packets based on its MAC address.

Suppose the devices have the following IP addresses:
home agent—192.168.3.15
foreign agent—192.168.22.71
mobile client—192.168.3.11

An example of the tunneling operation for downstream traffic is also illustrated in FIG. 7. In this alternate embodiment, instead of representing routers, the home agent 702 and the foreign agent 706 represent WLAN switches.

Figure 8:
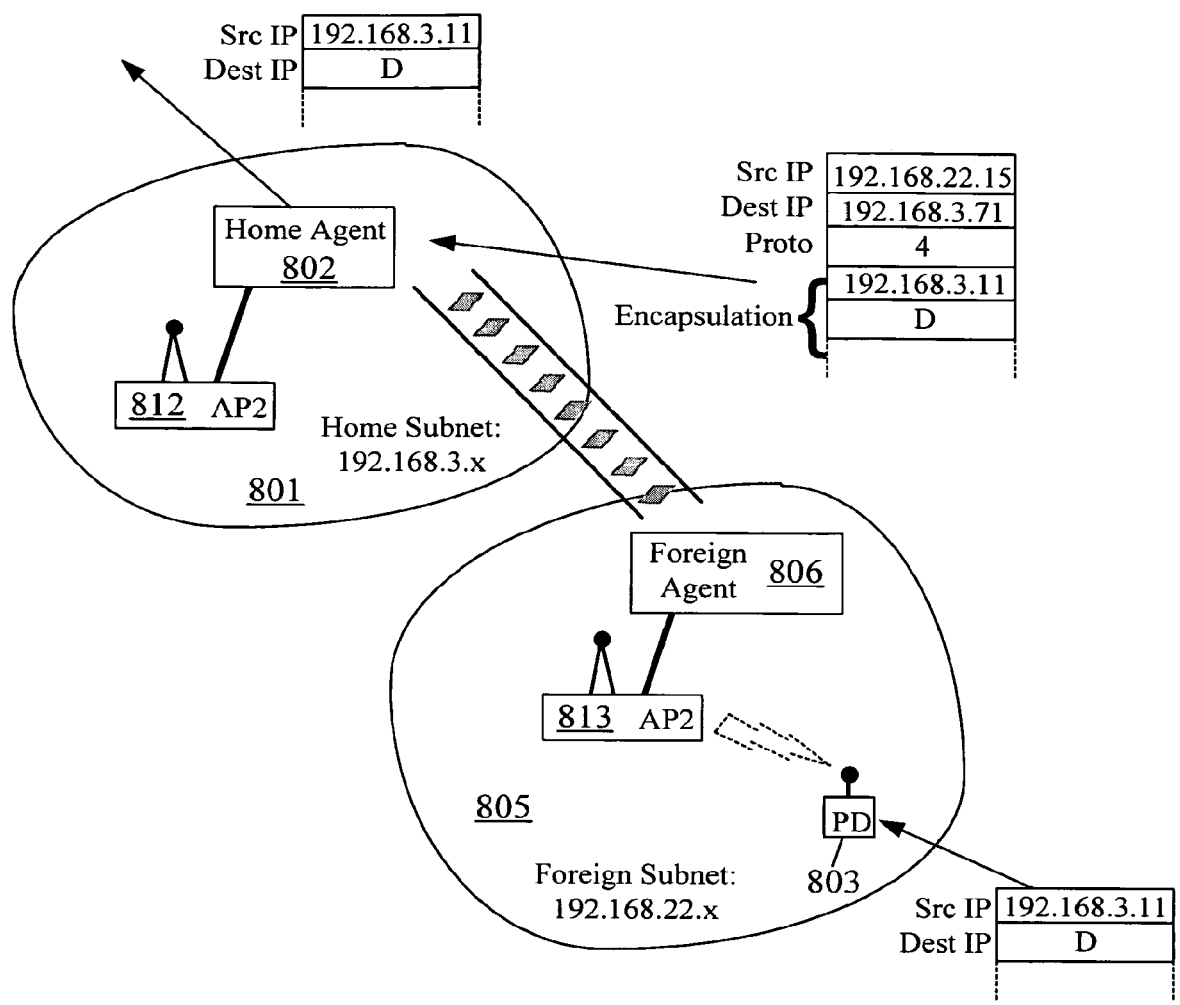
FIG. 8 illustrates an example of upstream tunneling in mobile IP between foreign and home subnets, according to an alternate embodiment of the present invention.

The mechanism for sending upstream traffic is similar to that of downstream traffic, and is illustrated in FIG. 8. The process is simply reversed. Packets from the mobile client 803 are processed at the foreign agent 806, namely, the Enterprise WLAN Switch, through the AP2, 813 of the foreign subnet 805. The switch will encapsulate the actual upstream packet into an IP-in-IP packet, and send it to the home agent 802 through the tunnel. The home agent 802 services the subnet 801 through the AP2 812. The home agent, which is the WLAN Switch the mobile client originally associated with, will remove the IP-in-IP header and send the actual packet to the network.

Tunneling is a reliable, scalable model to re-direct traffic in WLAN mobility. However, this model requires extra processing power in the WLAN switch to handle the tunneling, as well as extra bandwidth in the wired LAN because the traffic travels an extra hop.

Handoff should be a seamless operation. The session and the applications should not be disrupted during handoff. In an ordinary login session, or a normal connection-oriented application like FTP, there is more leeway in performance. However, in non-connection-oriented, delay sensitive applications like VOIP, speedy hand-off of session and application information is mandatory. Having a list of new AP candidates in place in the client would vastly improve the handoff overhead.

In VOIP, the relevant performance issue is downstream (WLAN to client) packet loss when the wireless IP phone roams from one AP zone to another. During a same-switch hand-off, the switch's decision to switch the voice packets from one physical port to another would take infinitesimal time. However, an across-switch hand-off is more complicated and time consuming. The old WLAN switch has to re-transmit the voice packets to the new WLAN switch, while at the same time, notify the any interim router to re-route the packet to the new WLAN such that it would be routed to the direction of the old switch again. All these actions have to be taken place within a time span for the end-user not to notice a broken conversation.

This time span is determined by the voice codecs used in the IP phone, as most voice compression algorithms have the capability to smooth out the speech due to lost packets. The time span of this smoothing out, or sample interpolation, varies from codecs implementation to implementation. As a rule of thumb, the perceived voice quality suffers if 3-5% of the packets are lost. As an example, for a sentence of 3 seconds, 90-150 ms of lost voice frames would be unnoticeable. Sample interpolation is particularly ineffective when the voice pattern transitions from silence to speech. In a WLAN environment, hand-off between APs is usually completed in single-digit milliseconds.

Network Management

With Wireless LANs poised to be so prevalent in the enterprise. Management of all the access points becomes a major issue for IT managers. The management problem becomes more acute in large, multi-site enterprises. For the most part, access point management solutions were designed in simpler times, such as when you might have only a half-dozen of these devices in an office. But now that companies are buying enterprise-class wireless products in enterprise quantities, limited management is not sufficient. Along with an enterprise-class wireless installation, there needs to be enterprise-class management. Preferably, this enterprise class management integrates seamlessly with the LAN management tools already deployed in the enterprise.

In conventional Wireless LANs, those systems do not have multi-vendor management and a multi-vendor WLAN management interface would be helpful in allowing for an administrator to manage the entire enterprise. Current WLAN management tools do not provide a global view of wireless network activity, but can provide easy access to information about each wireless access point on the network. For each device, one can view packet statistics to determine how many packets of what type have passed through. One can also see the bridge and address resolution tables, and in a status area, one can see alarms and general operating condition (such as whether the access point is turned on). However, in the case of wireless enterprise networks, better management tools are needed to manage all of the devices using the network.

The deployment of WLAN solutions in the enterprise can be dependent on the ability of IT managers to manage enterprise-class WLAN networks. Features that may be included within enterprise-class WLAN management tools fall into two major categories: installation features and maintenance features. With respect to installation features, WLAN network topology recognition allows for the auto-discovery capabilities turn Access Points (APs) into "plug-and-play" devices. Once an AP is connected to the network, the WLAN manager instantly detects it, even if it is not configured. Additionally, the installation features may include the automatic distribution of pre-defined settings such as the IP address, net address, and other configuration parameters to all APs and detection of unauthorized AP's by using a network "password" for new devices that join the wireless LAN.

With respect to maintenance features, these features include a check of the status of every access point in the managed WLAN from a central management console. Also included is the ability to change settings of every access point in the managed WLAN such as broadcast settings, radio frequencies, and device shut-down and boot-up times and to provide the ability to distribute AP software upgrades in an automated fashion. The maintenance feature can also include the ability to read and backup device configuration and software, to provide global view of WLAN usage and identify overloaded and underused access points and to provide quick detection of WLAN performance degradation and access point faults.

Other maintenance features include manage network access and usage based on user location, manage access to shared network resources such as printers, fax and projectors and collection of advanced Traffic Statistics based on SNMP, RMON and RMON2. Usage patterns and network activity measurements are critical in determining optimal placement of access points, proper load balancing which ultimately leads to better network performance. Additionally, support multiple vendors is critical in large enterprises where heterogeneous equipment may be deployed in both the wired and wireless parts of the network. IT managers will choose a WLAN solution that can be managed using the tools they already have in place in the enterprise. Related to the latter is the management of remote site wireless LANs from a centralized location using the standard corporate network.

Germane to the management tools is the key role that the WLAN switch plays in the several areas of WLAN management. These include statistics gathering, where the AP has limited counters, and hence the switch is the entity that enables gathering of advanced statistics and topology discovery, where the switch is the logical choice to be the central entity in the topology discovery process. Also important is multi-vendor support, where the switch can unify upstream management info into the central manager and distribute downstream info in a vendor-specific fashion, thus providing simple, cheap multi-vendor support. Additionally, the WLAN switch provides manage access to shared network resources using the advanced filtering capabilities and remote management, where the advanced filtering features in the switch can securely enable management of WLAN networks across multiple sites.

Load Balancing

In most WLAN environments, a wireless client get solid signal strength from multiple APs, thus the wireless client wants to associate with the AP that can provide the best performance. It is crucial to balance the APs' load to give optimal performance to all clients because it allows for a scalable enterprise solution that makes efficient use of the available bandwidth. There are two possible network configurations that enable load balancing, either having an AP bank installed in one WLAN zone, or placing APs strategically such that each pair of neighboring APs would have substantial overlapping area. The outcome of load balancing is to not have some APs overloaded while other APs underutilized, when these APs are covering the same zone.

There are two approaches in load balancing, a distributed approach and a centralized approach. In a distributed approach, the client and the APs jointly make the decision of which AP should be associated with the client. In a centralized approach, a central Load Balancing Manager collects various network statistics and status and makes the load balancing decision. The requirements of both approaches are addressed in this section.

In distributed load balancing, the load balancing decision is negotiated between the wireless client and the APs. The standard way is for the client to decide which AP to associate with, based on the current traffic status of the AP. This distributed approach shifts the responsibility down to the wireless LAN, thus it does not need any resources in the LAN to collect statistics from various APs and make such decisions.

In distributed load balancing, the client has a list of AP candidates from which it gets adequate signals. It is the client that decides which AP to associate. In a WLAN that does not support load balancing, the client may choose an AP randomly, the first AP it detects, the last AP it detects, or the one with the strongest signal, etc. However, this arbitrary scheme does not lead to optimal performance in the WLAN.

A more efficient approach is for the client to examine the load of the various APs, and associate with the AP that will give it the best performance. In most cases, it will choose the AP with the lightest load. In order to provide data to the clients, the APs must be able to collect and keep various statistics. Sample statistics may include the number of clients associated, the number of packets transmitted or received, average incoming and outgoing bandwidth consumed in recent past, and priorities of the recent traffic. A mechanism for the AP and the client to exchange load information is needed, which will be addressed below.

There must be a communication mechanism for the AP and the client to communicate load information, such that the client can make an intelligent decision on associating AP. A Layer 2 protocol is desired as such communications may take place even before the client is authenticated in the network, i.e. before the client even acquires an IP address. The client can then collects the load status and signal strengths from various APs, and make the association decision based on multiple parameters.

A Virtual Channel (VC) is one mechanism for the AP and the client to communicate load information. A VC is a mechanism for compliant devices to communicate with each other in Layer 2. In other words, for wireless clients and APs built from compliant wireless devices, there come with an advantage of supporting distributed load balancing.

The objective of load balancing is to make sure that the clients are receiving optimal WLAN accesses. To judge the effects of load balancing, most, if not all, clients must be receiving optimal services. This can be measured by clients receiving the bandwidth requested, the number of dropped packets, due to AP/WLAN switch congestion and wireless collision, and whether packets are getting the appropriate prioritization. Like the Mobility issue, another requirement for load balancing is very similar to that of mobility handoff. The same principles of session persistency and application persistency also apply here. Service interruption should be kept to a minimum.

In centralized load balancing, the load balancing decision is made by a load balancing manager. This manager can be located anywhere in the LAN; it may also be collocated with the WLAN switch. The reason for the centralized approach is to follow an overall network load balancing policy. Clients are not allowed to select whichever AP it wants. Various aspects of the load balancing requirements are discussed below.

In AP load balancing, a pool of client stations accessing the WLAN from one zone may access through one or more APs. It is the uneven distribution of clients per AP that calls for load balancing. The criteria to balance load is configurable by the WLAN administrator. It can be based on traffic load, signal strength, types of client, etc. The decision to monitor traffic load from an AP zone, as well as its neighboring zones, belongs to a Load Balancing Manager, which may be collocated in the WLAN Switch. The Load Balancing Manager examines traffic capacity of various APs in a zone, and makes decision to switch selected clients from one AP to another.

A Load Balancing Manager (LBM) administers load balancing. It can be a proactive or a reactive mechanism. In proactive mode, the LBM checks the network condition periodically to determine the need to balance load; while in a reactive mode, the network manager alerts the LBM when certain statistics reach pre-determined thresholds. To come up with a load switching decision, it examines the two types of parameters: static and dynamic parameters.

Static parameters are parameters programmed when the WLAN is configured. These parameters are most likely stored in a database. Some static parameters include network topology of APs, where this database of information indicates which APs zones are overlapped, that clients in the zone can be transferred from one AP to another. Other static parameters include AP Resources, which indicate the AP capabilities, most notably the AP capacities, bandwidth management granularity of the AP, the AP MAC addresses, as well as available frequencies.

Dynamic parameters are parameters that change when the WLAN is in operation with clients accessing the WLAN. These parameters are primarily obtained from the network management MIB in the WLAN. Some dynamic parameters include signal strength of client stations, where when transferring a client station from one AP to another, the signal strength the new AP receives from the client must exceed a pre-determined threshold. Another dynamic parameter is the AP traffic load. From this parameter, the load balancing process determines which AP within a zone is overloaded and which AP is underutilized. Another type of dynamic parameter is the client traffic load, where this parameter examines the client traffic profile, both the average bitrate and the peak bitrate, as well as bandwidth management parameters, to determine which client station(s) are the best candidates to be moved. Also included are application-based parameters that determine how applications are distributed to APs, particularly in an AP BANK. Rather than making a decision based on traffic load, this decision is based on applications. A policy may give delay-sensitive applications (e.g. VOIP, streaming media, etc.) higher preferences to be moved to a lighter load AP; another policy may dedicate one AP for non-delay-sensitive, bandwidth consuming applications (e.g. peer-to-peer type movie downloads) while keeping lighter loads on other APs. The dynamic parameters can also be client based. Like the application-based, this criteria would re-distribute active clients based on their identities. These clients include employees whose LAN access is mission critical, executives, etc. By recognizing the MAC addresses or login IDs of selected clients, the load balancing process may choose to move these clients to lighter loaded APs. Generally, the performance requirements for a centralized approach are the same as those from the distributed approach.

Quality of Service

There are two aspects of Quality of Service (QoS) in a wireless LAN that are important to the present invention, namely the wireless medium and the wired medium. QoS of the wireless medium is covered by the IEEE standard 802.11e, an enhancement of the IEEE 802.11 standard, while QoS of layer 2 of the wired medium is covered by IEEE 802.1p. To provide end-to-end QoS for devices within the enterprise WLAN, both the wireless and the wired medium should be QoS-enabled.

Two QoS mechanism should be supported in the WLAN; they are traffic prioritization and bandwidth management. Traffic prioritization involves recognizing certain types of traffic and providing preferential treatment to it, mostly delay sensitive traffic. Bandwidth management includes providing a minimum bandwidth allocation and a maximum limit to certain traffic flows, such that these flows would conform to prior agreed on Service Level Agreement (SLA).

Traffic Prioritization is significant for delay-sensitive traffic, such as voice or video traffic. This type of traffic has a small latency to reach its destination without performance degradation. In other words, delay-sensitive traffic in a switch congested with regular data traffic would enormously affect its delivery to the destination, resulted in broken voice or video being displayed at the client.

A WLAN switch should have the means to support traffic prioritization, such that the delay sensitive traffic would enjoy higher priority than regular data when being processed in the switch. There are two approaches for traffic prioritization: honoring the prior priority or establishing a new priority policy.

Honoring the priority that comes with delay-sensitive traffic assumes that the delay-sensitive traffic would be specially marked before it arrives at the switch. The special mark may come in the form of an IEEE 802.1p priority. In a WLAN environment, the priority may be an IEEE 802.11e priority originated from the wireless client, which the AP includes as an IEEE 802.1p priority when it converts the wireless frames into an Ethernet frame.

By honoring the pre-marked priority of the traffic, the switch assumes that the clients and the AP are trustworthy, i.e. the priority-marked packets are trusted. However, this approach has its drawback, simply because the wireless client may abuse the trust the switch gives. It may mark all its traffic with a higher priority, regardless of traffic type. This would lead to an abuse of the prioritization policy, and thus an alternative solution.

Alternatively, a WLAN switch may establish its own prioritization policy. An alternative of the switching honoring pre-marked priorities of the packet is having the switch set the prioritization policy. In this approach, the switch assumes the packets come in unmarked, and establish the policy using its packet filtering capability. The switch should be capable of recognizing packets from VOIP or streaming media applications that are delay-sensitive, and assign higher priorities to these packets. In other words, the switch assumes all the arriving packets are untrusted in the QoS point of view.

In IEEE 802.11e, the client can also register a flow of traffic and request certain QoS considerations for that flow in the wireless medium. In an untrusted network, this flow should be cross-referenced with the WLAN's QoS policy such that the QoS requested for the flow conforms to the overall WLAN policy of that flow. The WLAN switch should be able to support both QoS approaches. Whether it honors the pre-marked packet priority, establishes its own policy, or use a combination of both, should be configurable by the network administrator.

To support traffic prioritization, a WLAN expects traffic in the trusted part of the network to be prioritized using IEEE 802.1p priority tag. If the switch does not trust the QoS marking of the packets and establishes its own prioritization policy, packet filtering can only be performed on unencrypted packets. In other words, in order to detect the content of the packets in order to prioritize them, the packets must not be encapsulated in an IPSec or VPN tunnel.

In the wireless leg of the traffic, QoS can be enabled by IEEE 802.11e, which is a MAC level enhancement of IEEE 802.11, 802.11b, 802.11a and 802.11g. The WLAN can leverage a uniform QoS policy by coordinating 802.11e on the wireless side and 802.1p on the wired side. Any QoS configuration can be communicated between the WLAN switch and the AP such that both devices can enable the same priority and bandwidth limiting for the same traffic stream. For wireless clients to enjoy the QoS in the wireless medium, the clients have to be compliant to the IEEE 802.11e standard. In other words, it cannot behave contrary to the standard. For example, traffic in a lower Traffic Category (TC) cannot have priority over a higher TC.

IEEE 802.11e specifies two QoS schemes, Enhanced Distributed Coordination Function (EDCF) and Hybrid Coordination Function (HCF). EDCF is a peer-to-peer QoS that every client, including the AP, in the wireless medium has the right to transmit; the clients resolve the conflict themselves if there is a contention; a higher priority packet simply has a better chance to win the conflict resolution than a lower priority packet. HCF, on the other hand, is a centrally controlled QoS scheme, with the AP serves as the coordinator. The AP allocates transmission opportunities (TXOP) to the other wireless stations. Based on the IEEE 801.11e standard and the two QoS schemes, a proposed partition of responsibilities between the switch and the AP in supporting traffic prioritization is described in the following table:

TABLE 2

| | EDCF | | HCF | |
| --- | --- | --- | --- | --- |
| | AP's role | Switch's role | AP's role | Switch's role |
| Upstream | All wireless devices, including the AP, must be IEEE 802.11e compliant to enjoy QoS | N/A | AP is solely responsible for assigning TXOP to clients | Establishes priority policy among clients and instructs the AP to follow such policy |
| Downstream | AP's prioritize traffic into different TC queues | Tag packets with IEEE 802.1p priority such that AP can honor | AP's internal scheduling provide TXOP to higher priority traffic | Tag packets with IEEE 802.1p priority such that AP can honor. |

For traffic prioritization, the WLAN Switch's filtering engine must be able to create distinctive filters for each individual client. The performance limit on providing QoS to traffic flows is based on the size of the filtering engine, i.e. the number of filters allowed. If the AP is also capable of doing traffic classification, as suggested but unspecified in IEEE 802.11e, then the number of traffic flows that can enjoy traffic prioritization is bounded by the lesser size of the WLAN Switch filtering engine and the AP classifier.

Another QoS feature that a WLAN should offer is bandwidth management. Bandwidth management involves offering a minimum bandwidth and/or a maximum bandwidth for each traffic flow. In this context, a traffic flow is most likely associated with a particular wireless client device.

In a maximum rate limit, the aggregate bandwidth for all potential clients should not exceed the physical limit of the wireless transmission. For IEEE 802.11b, it's 11 Mbps, for IEEE 802.11a or 802.11g, it's 54 Mbps. Assuming all users are equal, in a 8 user wireless AP that supports IEEE 802.11a, each user should be rate-limited to about 6 Mbps in the ideal condition, while in IEEE 802.11b, each user should be rate-limited to about 1 Mbps in the ideal condition. Rate limiting is needed to ensure that each user does not hog all the bandwidth and create a starvation situation. A minimum rate guarantee ensures each wireless client has some minimal bandwidth to transmit data.

In a WLAN, the bandwidth management can be carried in both the AP and the switch. The switch can enforce rate limiting downstream traffic (e.g. downloading of peer-to-peer application files) of a particular flow, while the switch and the AP must coordinate to ensure a minimum bandwidth allocation for this flow. For minimum guaranteed bandwidth and rate limiting of upstream traffic, it must first be done at the AP.

The second Interface Requirement in traffic prioritization also applies here. To enjoy bandwidth management, the traffic flow has to be identified. If the flow is identified by IP header information, then the packet cannot be encapsulated in an IPSec/VPN tunnel. Furthermore, the wireless clients must be compliant to the IEEE 802.11e standard for the bandwidth management to be in effect.

Again, based on the IEEE 801.11e standard and the QoS scheme of HCF, a proposed partition of responsibilities between the switch and the AP in supporting traffic prioritization is described in the following table. The QoS scheme of EDCF, due to its peer-to-peer nature, is incapable of supporting bandwidth management.

TABLE 3

| | EDCF | | HCF | |
|---|---|---|---|---|
| | AP's role | Switch's role | AP's role | Switch's role |
| Upstream | N/A | N/A | AP is solely responsible for assigning TXOP to clients, in terms of # of TXOP and duration, to meet the bandwidth requirements | Establishes bandwidth policy among clients and instruct the AP to follow such policy |
| Downstream | N/A | N/A | AP's internal classifier and scheduler specify # of TXOP and duration for its own downstream traffic, to meet the bandwidth requirements | Use rate limiting to control downstream bandwidth |

The WLAN Switch's filtering engine must be able to create distinctive filters for each individual client to support bandwidth limiting. The performance limit on providing bandwidth management to client stations is based on the size of the filtering engine, i.e. the number of filters allowed.

Messaging Protocol

A Messaging Protocol (MP) is a proprietary protocol meant for communication between compliant wireless networking devices. The description of MP herein focuses on MP interactions between the AP and WLAN switch. The information exchanged between these two devices includes the configuration and status information of the unit, as well as the client session information. Such information is exchanged in order to enable the six features mentioned in the previous sections in the WLAN.

The MP runs over the TCP or UDP protocols using the well-known port number specified under the framework of a Device Communication Protocol (DCP). Under the DCP umbrella, there are several sub-protocols defined for the purpose of communications in other Broadcom products. MP is just a new protocol under the DCP for wireless and WLAN devices.

MP is used for communicating information between WLAN devices. There are five categories of messages in MP, as listed as follows. The AP status messages from AP to Switch or AP indicate AP capacity, bandwidth allocation, # attached clients, signal strength, etc. The AP config messages from Switch to AP, to configure the AP to accommodate a client, including IEEE 802.11e QoS, security information, etc. The switch status messages, from Switch to Switch, indicate a switch's association with clients, including the client's session information, access control, QoS parameters, etc. The switch config messages, from switch to switch, configure a WLAN Switch to accommodate a client, including access control, QoS configuration, etc. The client status messages, from AP to Switch, are messages indicating a client's information, including the identification, associated MAC address, session status, connecting location, etc.

In each message category, the message has three message subtypes: request, data, and ack. These subtypes represent the request of data, the transmission of data itself, and an acknowledgement of the reception of data. In some instances, the exchange consists of a request and a response, while in some other instances, the data is sent voluntarily, which should be followed by an acknowledgment.

Applications

This section addresses some application scenarios in the enterprise wireless LANs, according to several embodiments of the present invention. In these applications, the sequence of events in various operations, such as login, logoff, handoff, etc. are addressed. These applications do not represent all of the applications of the present invention, but are representative of the many applications embodiments that are encompassed by the present invention.

Two common applications in the wireless LAN environment are regular computing with wireless laptop, and wireless IP phone. They are described in details in the rest of this section.

The enterprise wireless LAN was intended to be used for wireless connection of laptop computers to the LAN, such that the wireless client can access files and service in the corporate LAN, as well as the public Internet. With that objective, connections to laptop computers are first and foremost the most important application in a wireless LAN environment. The usage scenarios in laptop computing are addressed in the following sub-sections.

The first scenario is Session Initiation, or Client Login to the Wireless LAN. Before this operation, it is assumed that the AP will broadcast beacon frames out to all wireless devices in its vicinity to announce its presence and its MAC address. Any client device attempting to connect thus knows where to send the request.

A list of events is listed as follows. Client sends connection request to AP and the AP determines it is a new client, and sends login prompt to it. The client responds with identity and the AP sends client identity to Authentication Server. The Authentication server responds with a One-Time Password (OTP) challenge and the AP sends OTP challenge to client. The client responds to AP with a password, the AP passes client password to Authentication Server, and upon successfully authenticated, Authentication Server responds with encryption key. The AP passes encryption key to client, the AP also passes client status (identity, MAC address, etc.) to WLAN Switch and the WLAN Switch enable additional access control for client, e.g. subnet, time duration, location, QoS, etc.

Figure 9:
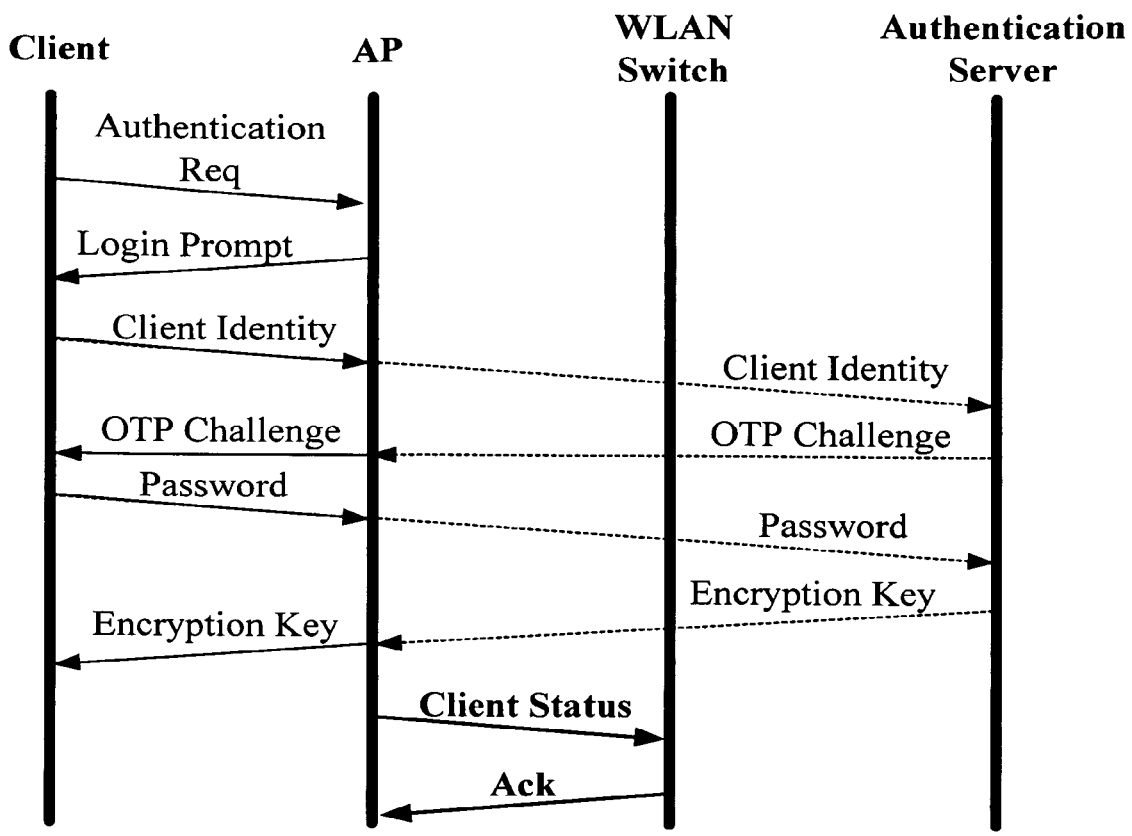
FIG. 9 illustrates the message exchange sequence for client login, according to one embodiment of the present invention.

The sequence of messages exchanged between Client, AP, Authentication Server and WLAN switch is illustrated in the Message Sequence Chart of FIG. 9. In this exchange sequence, there are two types of messages. The Extensible Authentication Protocol (EAP) from IEEE 802.1x for session authentication, and the Messaging Protocol (MP) for communicating the session information between the Broadcom-enabled AP and Broadcom-enabled WLAN switch.

Figure 10:
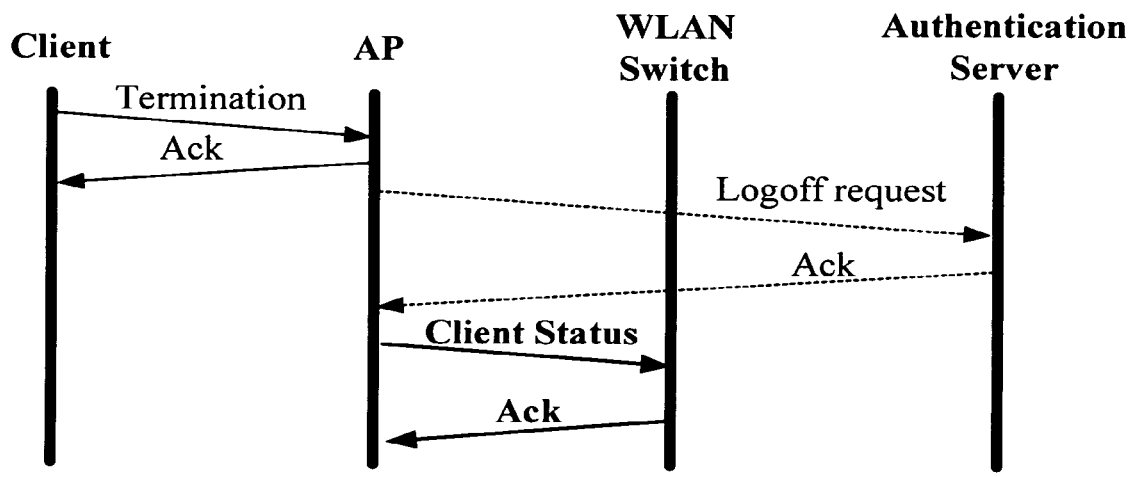
FIG. 10 illustrates the message exchange sequence for client logoff, according to one embodiment of the present invention.

The session can be terminated by client logoff, by session idling, by access policy and by explicit action by the network administrator. The sequence of events in a client logoff is listed as follows. The client sends logoff request to AP and the AP acknowledges. The AP sends logoff request to Authentication Server, the Authentication Server acknowledges, and the AP sends client status (logoff) to WLAN Switch. The WLAN Switch acknowledges and the WLAN Switch cleans up session information established for this client. The sequence of messages exchanged between Client, AP, Authentication Server and WLAN switch is illustrated in the Message Sequence Chart provided in FIG. 10.

Handoff is a pseudo session initiation/termination, but without the need of authentication. Handoff is triggered by detection of a strong new signal and degradation of the old signal, on top of receiving the broadcast beacon of the new AP. In the Enterprise WLAN, there are two types of handoff, handoff between two APs that are connected to the same WLAN switch, and between two APs that are connected to different WLAN switches. The latter scenario is a little more complicated because it involves transferring of information between the two switches.

Figure 11:
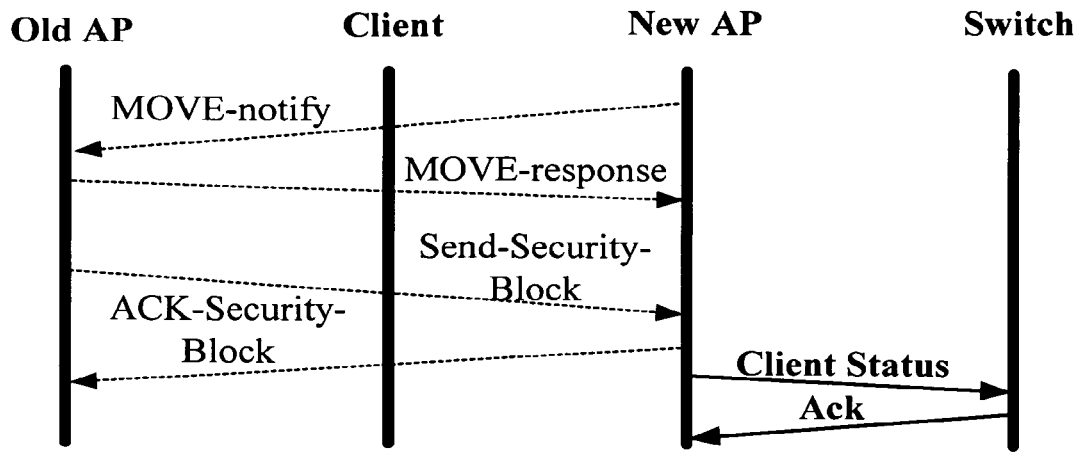
FIG. 11 illustrates the message exchange sequence for same switch handoff, according to one embodiment of the present invention.

For same-switch handoff, the sequence of events is listed as follows. The client sends request to old AP for disassociation and new AP for reassociation. The new AP sends Move Notification message to old AP and the old AP responds with Move Response with a Session Context. The old AP also sends the client's security data (e.g. encryption key) to new AP and the AP acknowledges. The new AP sends Handoff information to WLAN Switch and the WLAN switch will transfer switching information from one port (connected to old AP) to another (connected to new AP). The Message Sequence Chart for Same-Switch Handoff among the old AP, the new AP, the client and the WLAN Switch, is illustrated in FIG. 11.

Figure 12:
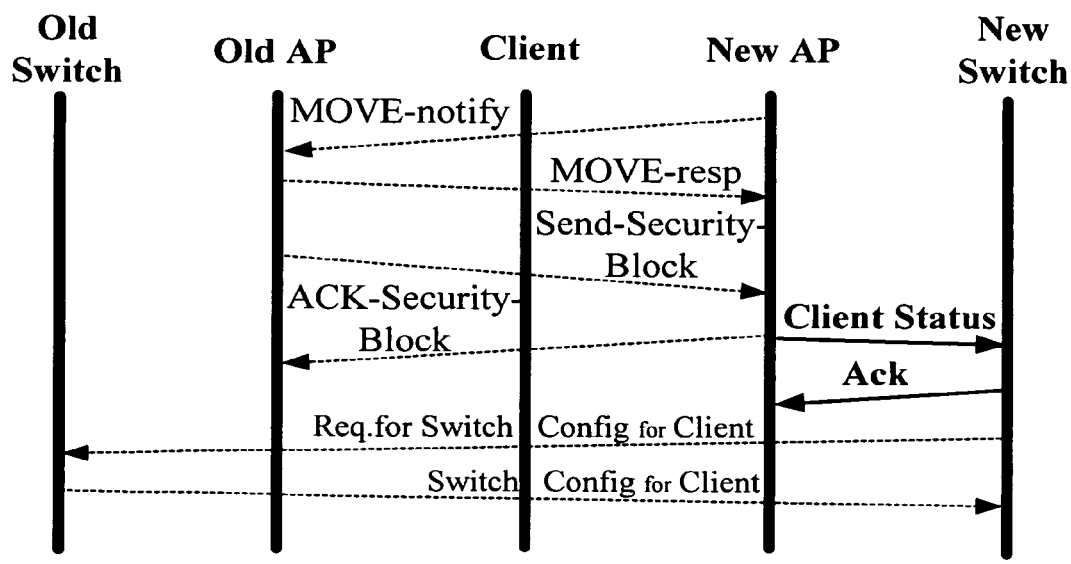
FIG. 12 illustrates the message exchange sequence for across switch handoff, according to one embodiment of the present invention.

For across-switch handoff, there will simply be some additional activities between the two switches. They are listed as follows. The client sends request to old AP for disassociation and new AP for reassociation and the new AP sends Move Notification message to old AP. The old AP responds with Move Response with a Session Context and the old AP also sends the client's security data (e.g. encryption key) to new AP. The AP acknowledges and the new AP sends Client Status (Handoff) to new WLAN Switch. The new WLAN switch requests for Switch Configuration for Client from old WLAN Switch old WLAN Switch will respond with Switch Configuration. The new WLAN Switch will enable switching intelligence (QoS, access policy, etc.) for client. The message exchange sequence among the client, old AP, new AP, old WLAN Switch and new WLAN switch is illustrated in FIG. 12.

The Wireless IP phone application is similar to the wireless Laptop computing application in the sense that it is simply a specific application in wireless computing, using a specific device. However, there are subtle differences in the operation scenarios that it warrants a separate section to address.

A major difference is that if the wireless IP phones should mimic the usage of cellular phones, a cellular phone convention must be honored when the phone is powered on, it is ready to dial; no login and password required. In other words, any authentication must be done implicitly based on MAC address. Another cellular phone's imitation is that entire number is dialed followed by a SEND key. Thus the phone itself does not require an off-hook/dial tone state, as seen in wired IP phone.

Another difference is that the wireless IP phones travel from zone to zone more often, whether the phone is in use or simply on call. An on-call phone is simply a live session that the phone is waiting for an incoming call, while an in-use phone has a phone conversation going on. In both instances, the phone corresponds to an active session of the wireless laptop computer. While a power-on but not-in-use phone can be handled with a slight delay in handoff, a live conservation must be handed off seamlessly with minimal delay.

Besides the usual devices in a WLAN, a WLAN that supports IP phone must also have an IP Phone Gateway (IPG) to switch calls. The IPG can be a server or an IP PBX in the LAN. It must have the interface to connect the call if the call destination is in the Public Switched Telephone Network (PSTN).

This section addresses two operation scenarios, call connection and call termination. In either case, either party can initiate the connection or the termination. The type of station of the other end of the call is irrelevant. It can be a PSTN number, an IP phone station inside the corporation, an IP phone outside the corporation, a legacy phone within the corporate PBX, and last but not least, another IP phone within the same WLAN.

There are two simple assumptions on the form of the numbers dialed: 1) if the number is an internal number, either an extension of a legacy PBX, an internal IP phone, or an internal wireless IP phone, a 5-digit number is used. The 5-digit number starts with a pre-determined prefix followed by the 4-digit extension. 2) If the number is an external number, either a number in the PSTN or a number in an external IP phone network, the E.164 number format is used. The E.164 number can be a 10-digit number starting with the area code, or a 7-digit number with no area code. In either case, the number is preceded by a dial-out prefix, which is the number '9' as configured in most corporate PBX. The various operation scenarios are addressed in the following sections.

The first scenario is Session Initiation, for a wireless IP phone to the Wireless LAN. The same assumption for wireless computing holds, that the AP will broadcast beacon frames out to all wireless device in its vicinity to announce its presence and its MAC address. In session initiation, a password may or may not be required when the phone is powered on.

The list of events is listed as follows. The events listed in Italics are optional, in that they correspond to an authentication process that requires a password. The client sends connection request to AP and the AP determines it is a new IP phone client, and sends request to IP phone for identity. The IP phone responds with identity (phone number) and the AP sends client identity to Authentication Server. The Authentication Server responds with One-Time Password (OTP) challenge and the AP sends OTP challenge to IP phone. The IP phone responds to AP with password and the AP passes IP phone password to Authentication Server. Upon successfully authenticated, Authentication Server responds with encryption key, the AP passes encryption key to client and the AP also passes client status (identity, MAC address, etc.) to WLAN Switch. The message exchange sequence in session initiation, in case a password is required, is identical to the chart illustrated in FIG. 12. If a password is not required, the arrows corresponding to the OTP challenge and its response are simply removed.

This section addresses a call initiation scenario. Assuming the VOIP protocol is a standard-based protocol, all the messages exchanged in this section are the Layer 5 VOIP protocol messages, over TCP/IP or UDP/IP. The protocol can be, but are not limited to, H.323, H.248 (MGCP), SIP, etc. In this scenario, the wireless IP phone (WIPP) itself initiates the call.

Figure 13:
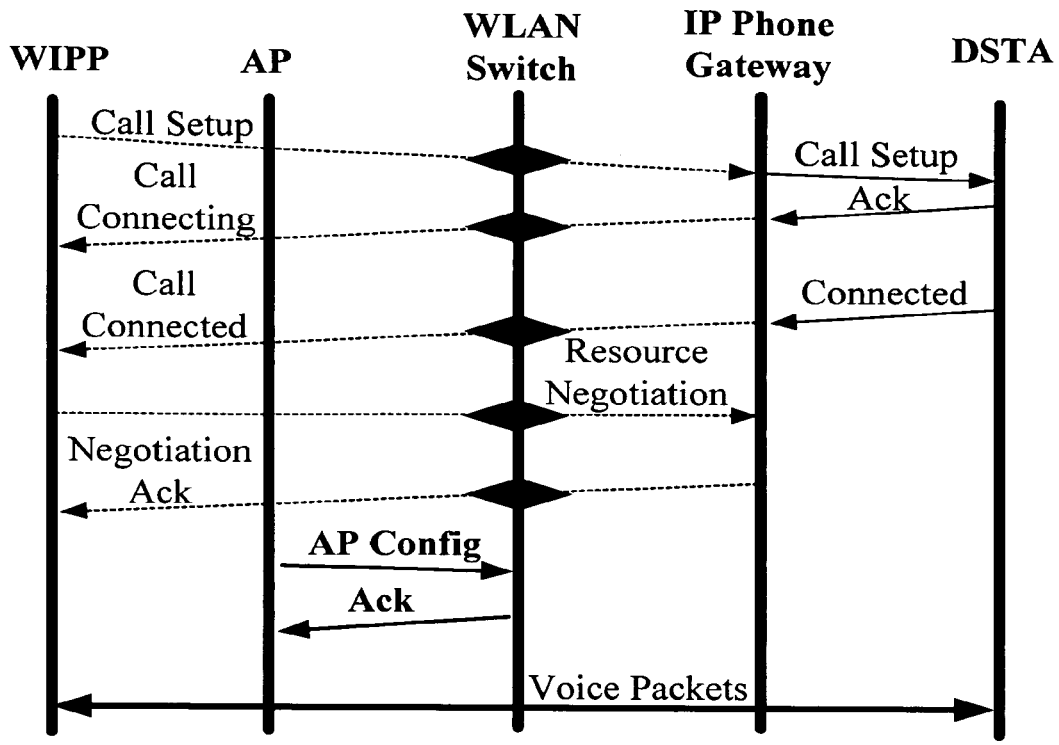
FIG. 13 illustrates the message exchange sequence for wireless IP phone call initiation, according to one embodiment of the present invention.

The list of events is listed as follows. WIPP sends call setup request (connection attempt to an internal extension or E.164 number) to IPG and the IPG determines whether the number is an internal IP phone number or a legacy number, then maps the number to either an IP address or a legacy phone number. The IPG sends connection request to destination station (DSTA), the IPG sends connection status to WIPP and the WIPP generates ringing tone. The IPG receives off-hook signal from DSTA, the IPG negotiates resources with WIPP and the resource negotiation completed, the conversation starts. The WLAN Switch snoops at all VOIP protocol messages, the WLAN Switch enables switching QoS for conversation, the WLAN passes call information to AP and the AP enables IEEE 802.11e QoS for this call. The message exchange sequence of in this scenario is illustrated in the FIG. 13.

Figure 14:
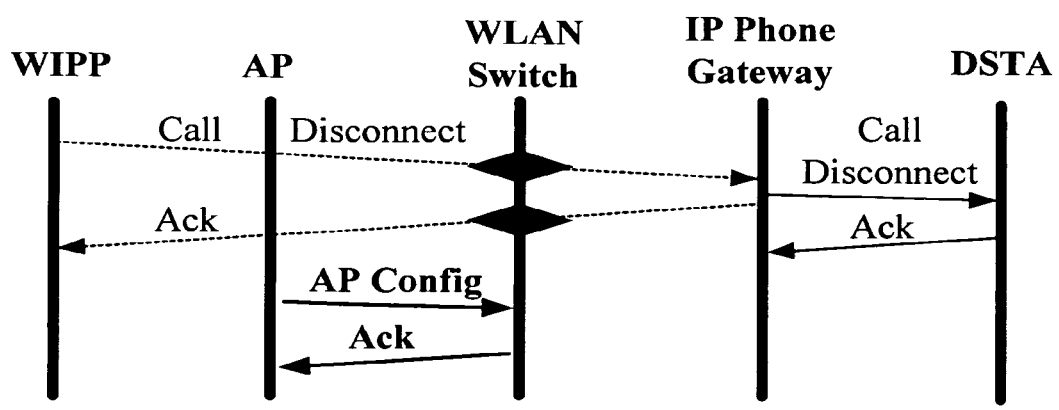
FIG. 14 illustrates the message exchange sequence for wireless IP phone call termination, according to one embodiment of this invention.

This section addresses a call termination scenario. Again, assuming the wireless IP phone itself initiates the call, the operation scenarios are described as follows. The WIPP sends call disconnect request to IPG and the IPG sends connection request to destination station (DSTA). The IPG sends disconnection request to DSTA and the IPG sends disconnection ACK to WIPP. The IPG releases resources for call session, the WLAN Switch snoops at all VOIP protocol messages and the WLAN Switch releases resources (QoS enabling) for this call session. The WLAN passes call information to AP, the AP releases resources (802.11e QoS) for this call session and the WIPP returns to on-hook state. The message exchange sequence is illustrated in FIG. 14.

The above-discussed configuration of the invention is, in one embodiment, embodied on a semiconductor substrate, such as silicon, with appropriate semiconductor manufacturing techniques and based upon a circuit layout, which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate. Additionally, the present invention can be implemented totally or partially through software.

In addition, while the term packet has been used in the description of the present invention, the invention has import to many types of network data. For purposes of this invention, the term packet includes packet, cell, frame, datagram, bridge protocol data unit packet, packet data and any equivalents thereof.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of employing a network device for controlling a flow of data associated with a wireless network, the method comprising facilitating:
    receiving data from a wireless device via one access point of a plurality of access points, wherein the data comprises a client identifier for the wireless device;
    mediating authentication of the wireless device with an authentication server;
    periodically polling for a status of the wireless device from the access point;
    receiving a request from a transferring wireless device through a first access point of the plurality of access points, wherein the transferring wireless device was previously associated with a second access point of the plurality of access points;
    monitoring usage by wireless devices of at least two of the plurality of access points, wherein coverage areas of the at least two of the plurality of access points overlap; and
    prompting the at least two of the plurality of access points to change the usage by the wireless devices such that a load carried by the at least two of the plurality of access points is approximately balanced,
    wherein the network device is operable to facilitate exchanging information relating to configuration, status, and client session statuses of one or more access points through a messaging protocol.

2. The method of claim 1, further comprising facilitating evaluating data packets received from at least one portion of the wireless network and from at least one access point; and
    wherein evaluating comprises filtering the received data packets, such that filtered data packets can be dropped to limit an effectiveness of a denial of service attack.

3. The method of claim 1, wherein mediating comprises facilitating restricting access to the wireless network by the wireless device based on a category of user determined from the client identifier.

4. The method of claim 3, wherein restricting comprises restricting access based on a type of device to which the wireless device belongs.

5. The method of claim 1, wherein mediating comprises facilitating restricting access to the wireless network by the wireless device based on an hour and a day of the week in which the data was received from the wireless device.

6. The method of claim 5, wherein restricting comprises restricting access based on at least one of a type of device to which the wireless device belongs and on a category of user determined from the client identifier.

7. The method of claim 1, wherein mediating comprises facilitating restricting access to the wireless network by the wireless device based on a physical location of the one access point of a plurality of access points.

8. The method of claim 1, wherein mediating comprises facilitating restricting access to the wireless network by the wireless device based on a type of an application, running on the wireless device, seeking network access for the wireless device.

9. The method of claim 1, further comprising facilitating forwarding updates to the configuration of the one or more access points to the one or more access points from a single site on the wireless network through a single update.

10. The method of claim 1, wherein the method allows the load carried by the at least two of the plurality of access points to be determined by at least one of a number of wireless devices using the at least two of the plurality of access points, a number of packets transmitted and received by the at least two of the plurality of access points and an average bandwidth carried by the at least two of the plurality of access points.

11. The method of claim 1, wherein the method allows the load carried by the at least two of the plurality of access points to be determined by at least one of priorities of packets recently transmitted and received by the at least two of the plurality of access points, a type of application running on the wireless devices and communicating with the at least two of the plurality of access points and a signal strength provided to the wireless devices provided by the at least two of the plurality of access points.

12. The method of claim 1, further comprising facilitating:
evaluating data packets received from portions of the wireless network and from at least one of the plurality of access points; and
passing the received data packets to portions of the wireless network and to the access points, based on the evaluation of the received data packets,
wherein said passing comprises maintaining a priority indicated by the data packets and tagging the data packets with a priority tag to be evaluated by the access points.

13. The method of claim 1, further comprising facilitating:
evaluating data packets received from portions of the wireless network and from at least one of the plurality of access points; and
passing the received data packets to portions of the wireless network and to the access points, based on the evaluation of the received data packets,
wherein passing comprises establishing a prioritization policy based on filtering of the data packets and tagging the data packets with a priority tag to be evaluated by the plurality of access points based on the established prioritization policy.

14. The method of claim 1, further comprising facilitating: establishing a bandwidth usage policy for the wireless devices and instructing the plurality of access points to follow the established bandwidth usage policy.

15. The method of claim 1, wherein the request is a re-association request, the method further comprising facilitating:
providing session information for the transferring wireless device to the first access point; and
updating a routing table with a routing location of the transferring wireless device.

16. The method of claim 15, further comprising encapsulating received data packets with Internet protocol information associated with the first access point and updating routing information in a local routing table.

17. The method of claim 1, further comprising facilitating:
receiving a re-association request from a transferring wireless device through an access point of the plurality of access points, wherein the transferring wireless device, which sent the re-association request, was previously associated with an alternate access point in communication with the wireless network through an alternate network device;
sending a request for configuration information for the transferring wireless device, which sent the re-association request, from the alternate network device; and
forwarding access point configuration data, determined from the configuration information received from the alternate network device.

18. A network device for controlling a flow of data associated with a wireless network, the network device comprising:
receiving means for receiving data from a wireless device via one access point of a plurality of access points, wherein the data comprises a client identifier for the wireless device;
receiving means for receiving a request from a transferring wireless device through a first access point of the plurality of access points, wherein the transferring wireless device was previously associated with a second access point of the plurality of access points;
mediating means for mediating authentication of the wireless device with an authentication server;
polling means for periodically polling for a status of the wireless device from the access point;
means for monitoring usage by wireless devices of at least two of the plurality of access points, wherein coverage areas for the at least two of the plurality of access points overlap; and
means for prompting the at least two of the plurality of access points to change the usage by the wireless devices to allow a load carried by the at least two of the plurality of access points to be approximately balanced,
wherein the network device is operable to facilitate exchanging information relating to configuration, status, and client session statuses of one or more access points through a messaging protocol.

19. An apparatus comprising:
a network device for controlling a flow of data associated with a wireless network, the network device configured to facilitate:
receiving data from a wireless device via one access point of a plurality of access points, wherein the data comprises a client identifier for the wireless device;
mediating authentication of the wireless device;
periodically polling for a status of the wireless device; and
receiving a request from a transferring wireless device through a new first access point of the plurality of access points, wherein the transferring wireless device was previously associated with a second access point of the plurality of access points;
monitoring usage by wireless devices of at least two of the plurality of access points, wherein coverage areas for the at least two of the plurality of access points overlap; and
prompting the at least two of the plurality of access points to change the usage by the wireless devices to allow a load carried by the at least two of the plurality of access points to be approximately balanced,
wherein the network device is configured to facilitate exchanging information relating to configuration of one or more access points through a messaging protocol.

* * * * *